(12) United States Patent
Asakage et al.

(10) Patent No.: US 8,601,799 B2
(45) Date of Patent: Dec. 10, 2013

(54) CONSTRUCTION MACHINE

(75) Inventors: Tomohiko Asakage, Akashi (JP); Takaharu Michida, Akashi (JP); Katsuki Yamagata, Akashi (JP); Kenji Onuki, Akashi (JP); Shintaro Sasai, Akashi (JP)

(73) Assignee: Kobelco Cranes Co., Ltd., Tokyo (JP)

( * ) Notice: Subject to any disclaimer, the term of this patent is extended or adjusted under 35 U.S.C. 154(b) by 143 days.

(21) Appl. No.: 13/413,971

(22) Filed: Mar. 7, 2012

(65) Prior Publication Data

US 2012/0227388 A1 Sep. 13, 2012

(30) Foreign Application Priority Data

Mar. 11, 2011 (JP) .................................. 2011-054597

(51) Int. Cl.
*F01N 3/00* (2006.01)

(52) U.S. Cl.
USPC .................. 60/295; 60/280; 60/286; 60/297; 60/303; 60/311

(58) Field of Classification Search
USPC ............ 60/280, 286, 295, 297, 299, 303, 311
See application file for complete search history.

(56) References Cited

U.S. PATENT DOCUMENTS

| 7,685,814 | B2* | 3/2010 | Zhang et al. | 60/295 |
| 7,743,604 | B1* | 6/2010 | Albanesi | 60/287 |
| 8,161,736 | B2* | 4/2012 | Tsukada et al. | 60/295 |
| 8,250,858 | B2* | 8/2012 | Kamiya et al. | 60/295 |
| 8,516,805 | B2* | 8/2013 | Hagiwara et al. | 60/295 |

FOREIGN PATENT DOCUMENTS

| JP | 3073380 | 6/2000 |
| JP | 2010-59620 | 3/2010 |

* cited by examiner

*Primary Examiner* — Binh Q Tran
(74) *Attorney, Agent, or Firm* — Oblon, Spivak, McClelland, Maier & Neustadt, L.L.P.

(57) ABSTRACT

Disclosed is a construction machine which comprises: a command changing regulation section; a loading device for imposing, on an engine, a load for raising an exhaust temperature of the engine up to a value at which particulate matter accumulated in a filter is burnt; and an instruction section for instructing the loading device to perform an operation for loading the engine. The instruction section prohibits the loading device from changing a loading level on the engine, during a period where a manipulation-state detection section detects a presence of a manipulation of a manipulation section. The command changing regulation section is set to a changing permission mode for permitting a value of a command which is to be assigned to an actuator control valve, to be changed according to changing a value of a command to be output from a manipulation device, during a period where the loading level is constant.

16 Claims, 6 Drawing Sheets

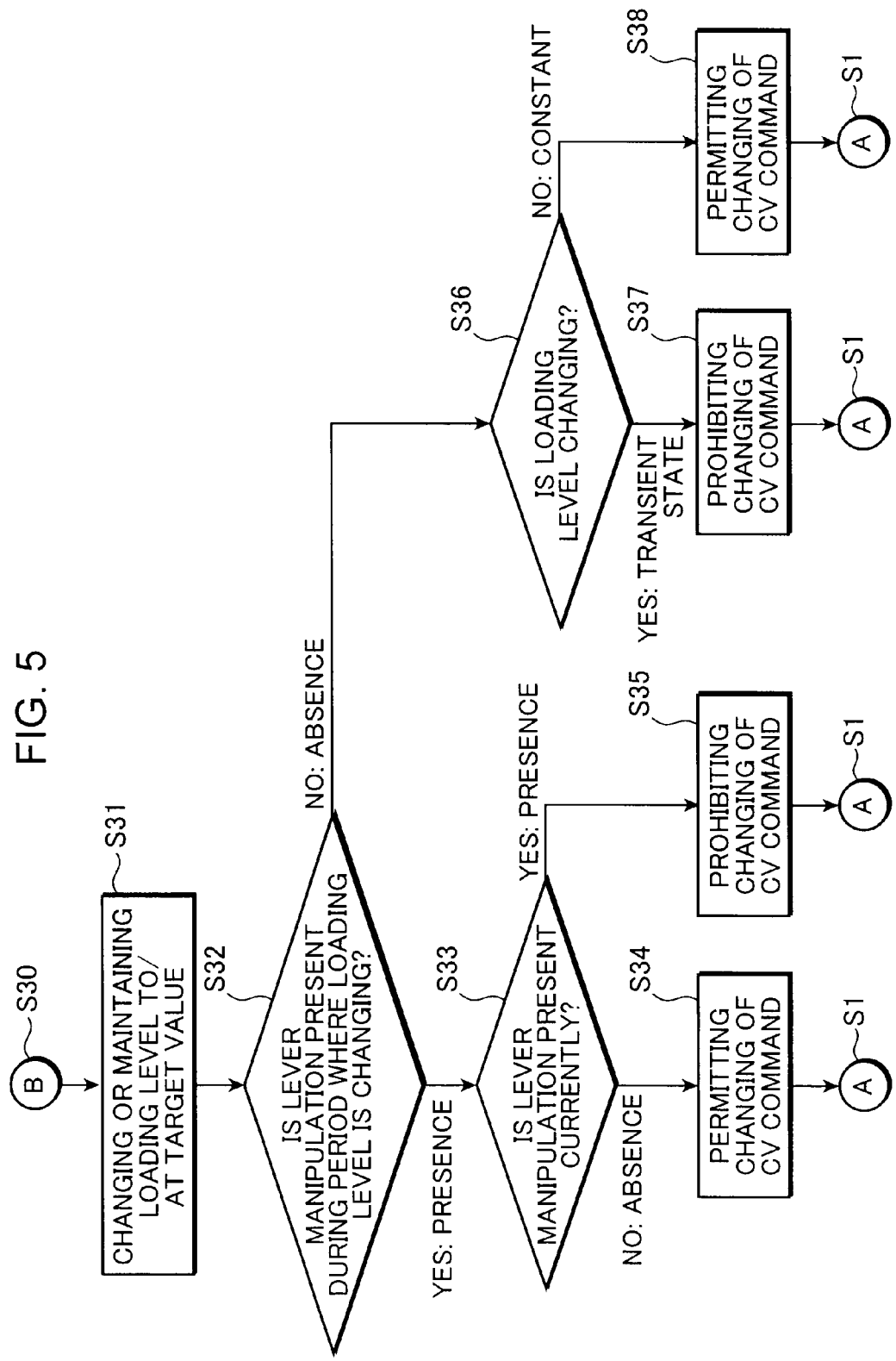

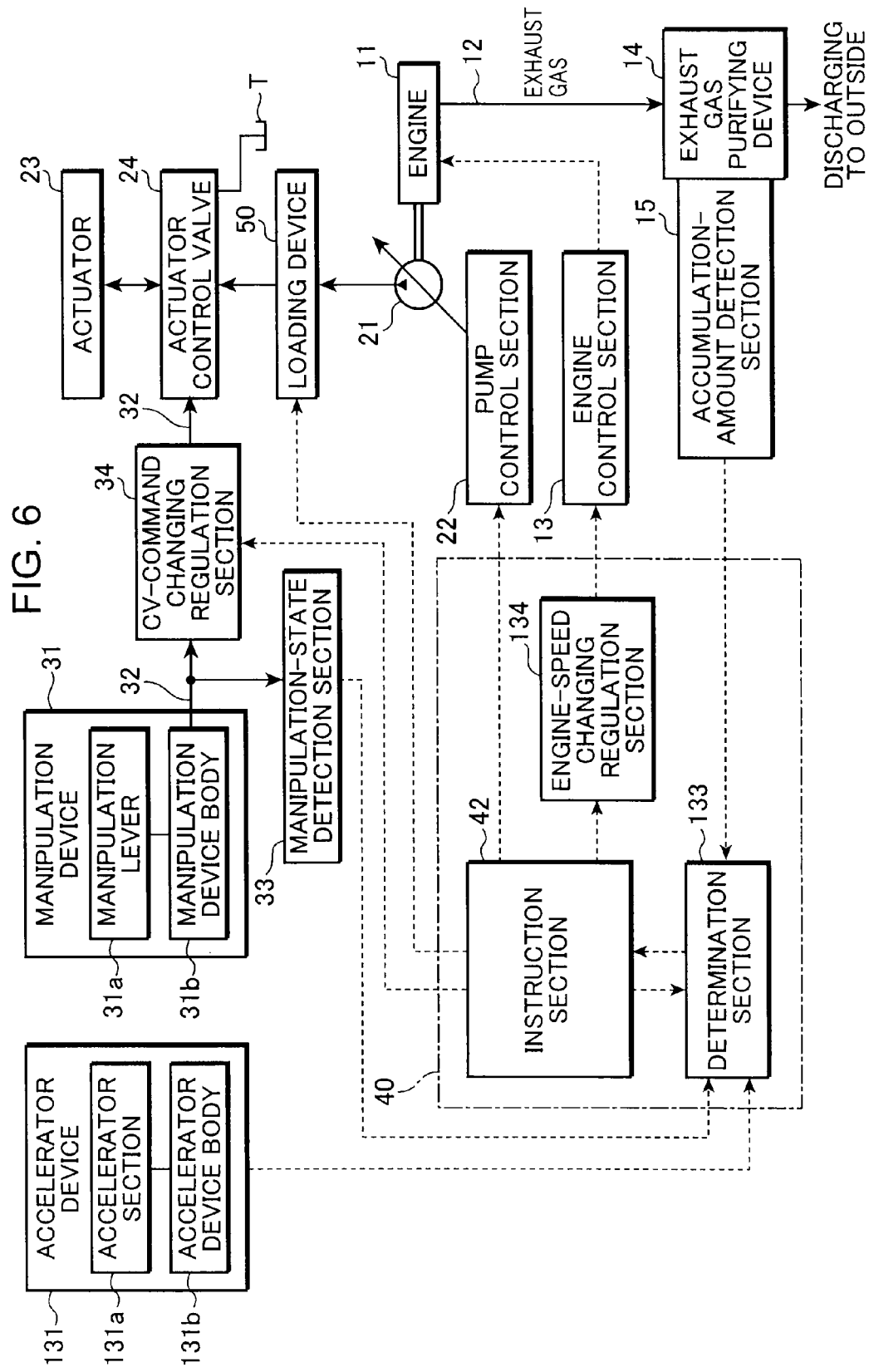

CONSTRUCTION MACHINE

BACKGROUND OF THE INVENTION

1. Field of the Invention

The present invention relates to a construction machine equipped with an exhaust gas purifying device.

2. Background Art

Heretofore, there has been known an exhaust gas purifying device designed to be installed in an exhaust pipe of a diesel engine. One example of such an exhaust gas purifying device is disclosed, for example, in JP 3073380B. An exhaust gas purifying device disclosed in the JP 3073380B comprises a DPF (Diesel Particulate Filter) which is an exhaust gas filter for trapping particulate matter, i.e., soot, contained in diesel exhaust gas. Generally, this type of exhaust gas purifying device is configured to regenerate the DPF as required. The regeneration of the DPF is performed by burning particulate matter accumulated in the DPF. The burning of the particulate matter is induced by loading an engine (imposing a certain load on an engine) to raise an exhaust temperature (exhaust gas temperature) of the engine.

Meanwhile, heretofore, there has been known a construction machine equipped with an actuator (hydraulic actuator) adapted to be operated by using an engine as a driving source. This type of construction machine comprises a pump configured to be driven by an engine, an actuator to which hydraulic oil is supplied from the pump, and an actuator control valve provided in a flow passage between the pump and the actuator to control the operation of the actuator.

Further, there has heretofore been known a construction machine equipped with the above exhaust gas purifying device and the above actuator. In this construction machine, if the actuator is manually controlled, while loading (i.e., imposing a load on) the engine to perform the DPF regeneration, the actuator is likely to be activated suddenly.

The JP 3073380B discloses a technique designed to prevent the sudden actuation of the actuator. For example, claim 2 of the JP 3073380B discloses a technique of performing the DPF regeneration only when the actuator control valve for controlling the actuator is in a neutral position. Further, the technique disclosed in the JP 3073380B is configured such that, if a manipulation lever is manipulated during the DPF regeneration, the DPF regeneration is cancelled. Therefore, this technique is likely to give rise to a situation where, during the DPF regeneration, the regeneration is cancelled, resulting in failing to accomplish the DPF regeneration.

Therefore, JP 2010-059620A proposes a technique designed to satisfy both of prevention of the sudden actuation of the actuator, and accomplishment of the DPF regeneration. Specifically, FIG. 2 of the JP 2010-059620A discloses a technique of disenable an operation of the actuator control valve until the DPF regeneration is completed. In other words, the technique disclosed in the JP 2010-059620A is configured to disenable an operation of the actuator over the entire period from start to end of the DPF regeneration.

However, this technique obliges a user of a construction machine to wait under the condition that the actuator is stopped, until the DPF regeneration is completed. A time required for the DPF regeneration depends on an amount of particulate matter accumulated in the DPF, but the time required for the DPF regeneration is generally in the range of several minutes to several ten minutes. The user of the construction machine cannot perform a work using the actuator during the DPF regeneration. Thus, the user of the construction machine will waste his/her valuable time. On the other hand, if a construction machine is configured to enable manual control of the actuator in parallel with the DPF regeneration, the actuator is likely to be activated suddenly, as mentioned above.

SUMMARY OF THE INVENTION

It is an object of the present invention to suppress the occurrence of a situation where an actuator is operated in a manner unexpected by an operator, during regeneration of a filter of an exhaust gas purifying device, and shorten a waiting time due to the filter regeneration.

According to one aspect of the present invention, there is provided a construction machine which comprises: an engine; an exhaust pipe connected to the engine; an exhaust gas purifying device having a filter installed in the exhaust pipe, wherein the exhaust gas purifying device is operable to purify exhaust gas discharged from the engine through the exhaust pipe, by using the filter; a pump driven by the engine so as to discharge hydraulic oil; an actuator connected to the pump via a flow passage and adapted to be operated in response to supply of hydraulic oil from the pump thereto through the flow passage; an actuator control valve provided in the flow passage between the pump and the actuator to control the operation of the actuator; a manipulation device having a manipulation section adapted to be manipulated by an operator, wherein the manipulation device is operable to output a command for providing an instruction about an operation of the actuator control valve according to the manipulation of the manipulation section; a manipulation-state detection section for detecting the presence or absence of the manipulation of the manipulation section; a command changing regulation section configured to be switched between a changing prohibition mode for, even if a value of the command to be output from the manipulation device is changed, fixing a value of a command which is to be assigned to the actuator control valve, to a value equal to a value of the command to be output from the manipulation device upon the absence of the manipulation of the manipulation section, and a changing permission mode for permitting a value of the command which is to be assigned to the actuator control valve, to be changed according to changing a value of the command to be output from the manipulation device; a loading device for imposing, on the engine, a load for raising an exhaust temperature of the engine up to a value at which particulate matter accumulated in the filter is burnt to allow the filter to be regenerated; and an instruction section for instructing the loading device to perform an operation for loading the engine, wherein the instruction section is operable to prohibit the loading device from changing a loading level, which is a level of load to be imposed on the engine by the loading device, during a period where the manipulation-state detection section detects the presence of the manipulation of the manipulation section, and wherein the command changing regulation section is set to the changing permission mode, during a period where the loading level is constant.

According to another aspect of the present invention, there is provided a construction machine which comprises: an engine; an exhaust pipe connected to the engine; an exhaust gas purifying device having a filter installed in the exhaust pipe, wherein the exhaust gas purifying device is operable to purify exhaust gas discharged from the engine through the exhaust pipe, by using the filter; a pump driven by the engine so as to discharge hydraulic oil; an actuator connected to the pump via a flow passage and adapted to be operated in response to supply of hydraulic oil from the pump thereto through the flow passage; a manipulation device having a manipulation section adapted to be manipulated by an operator, wherein the manipulation device is operable to output a command for providing an instruction about an engine speed of the engine according to the manipulation of the manipulation section; an engine control section for controlling an actual value of the engine speed so that the actual value of the engine speed becomes equal to a value of the engine speed instructed by a command input thereinto; a manipulation-state detection section for detecting the presence or absence of the manipulation of the manipulation section; a command changing regulation section configured to be switched between a changing prohibition mode for, even if a value of the command to be output from the manipulation device is changed, fixing a value of a command which is to be input into the engine control section, to a value equal to a value of the command to be output from the manipulation device upon the absence of the manipulation of the manipulation section, and a changing permission mode for permitting a value of the command which is to be input into the engine control section, to be changed according to changing a value of the command to be output from the manipulation device; a loading device for imposing, on the engine, a load for raising an exhaust temperature of the engine up to a value at which particulate matter accumulated in the filter is burnt to allow the filter to be regenerated; and an instruction section for instructing the loading device to perform an operation for loading the engine, wherein the instruction section is operable to prohibit the loading device from changing a loading level, which is a level of load to be imposed on the engine by the loading device, during a period where the manipulation-state detection section detects the presence of the manipulation of the manipulation section, and wherein the command changing regulation section is set to the changing permission mode, during a period where the loading level is constant.

According to yet another aspect of the present invention, there is provided a construction machine which comprises: an engine; an exhaust pipe connected to the engine; an exhaust gas purifying device having a filter installed in the exhaust pipe, wherein the exhaust gas purifying device is operable to purify exhaust gas discharged from the engine through the exhaust pipe, by using the filter; a pump driven by the engine so as to discharge hydraulic oil; an actuator connected to the pump via a flow passage and adapted to be operated in response to supply of hydraulic oil from the pump thereto through the flow passage; an actuator control valve provided in the flow passage between the pump and the actuator to control the operation of the actuator; a manipulation device having a manipulation section adapted to be manipulated by an operator, wherein the manipulation device is operable to output a command for providing an instruction about an operation of the actuator control valve according to the manipulation of the manipulation section; a command changing regulation section configured to be switched between a changing prohibition mode for, even if a value of the command to be output from the manipulation device is changed, fixing a value of a command which is to be assigned to the actuator control valve, to a value equal to a value of the command to be output from the manipulation device upon the absence of the manipulation of the manipulation section, and a changing permission mode for permitting a value of the command which is to be assigned to the actuator control valve, to be changed according to changing a value of the command to be output from the manipulation device; and a loading device for imposing, on the engine, a load for raising an exhaust temperature of the engine up to a value at which particulate matter accumulated in the filter is burnt to allow the filter to be regenerated, wherein the command changing regulation section is set to the changing prohibition mode during a period where a loading level which is a level of load to be imposed on the engine by the loading device, is transiently changing, and set to the changing permission mode, during a period where the loading level is constant.

According to still another aspect of the present invention, there is provided a construction machine comprises: an engine; an exhaust pipe connected to the engine; an exhaust gas purifying device having a filter installed in the exhaust pipe, wherein the exhaust gas purifying device is operable to purify exhaust gas discharged from the engine through the exhaust pipe, by using the filter; a pump driven by the engine so as to discharge hydraulic oil; an actuator connected to the pump via a flow passage and adapted to be operated in response to supply of hydraulic oil from the pump thereto through the flow passage; a manipulation device having a manipulation section adapted to be manipulated by an operator, wherein the manipulation device is operable to output a command for providing an instruction about an engine speed of the engine according to the manipulation of the manipulation section; an engine control section for controlling an actual value of the engine speed so that the actual value of the engine speed becomes equal to a value of the engine speed instructed by a command input thereinto; a command changing regulation section configured to be switched between a changing prohibition mode for, even if a value of the command to be output from the manipulation device is changed, fixing a value of a command which is to be input into the engine control section, to a value equal to a value of the command to be output from the manipulation device upon the absence of the manipulation of the manipulation section, and a changing permission mode for permitting a value of the command which is to be input into the engine control section, to be changed according to changing a value of the command to be output from the manipulation device; and a loading device for imposing, on the engine, a load for raising an exhaust temperature of the engine up to a value at which particulate matter accumulated in the filter is burnt to allow the filter to be regenerated, wherein the command changing regulation section is set to the changing prohibition mode during a period where a loading level which is a level of load to be imposed on the engine by the loading device, is transiently changing, and set to the changing permission mode, during a period where the loading level is constant.

BRIEF DESCRIPTION OF THE DRAWINGS

FIG. 5 is an operational flow chart of the construction machine illustrated in FIG. 1.

FIG. 6 is a block diagram illustrating a configuration of an example of modification of the construction machine according to the embodiment.

DETAILED DESCRIPTION OF THE EMBODIMENTS OF THE INVENTION

Figure 1:
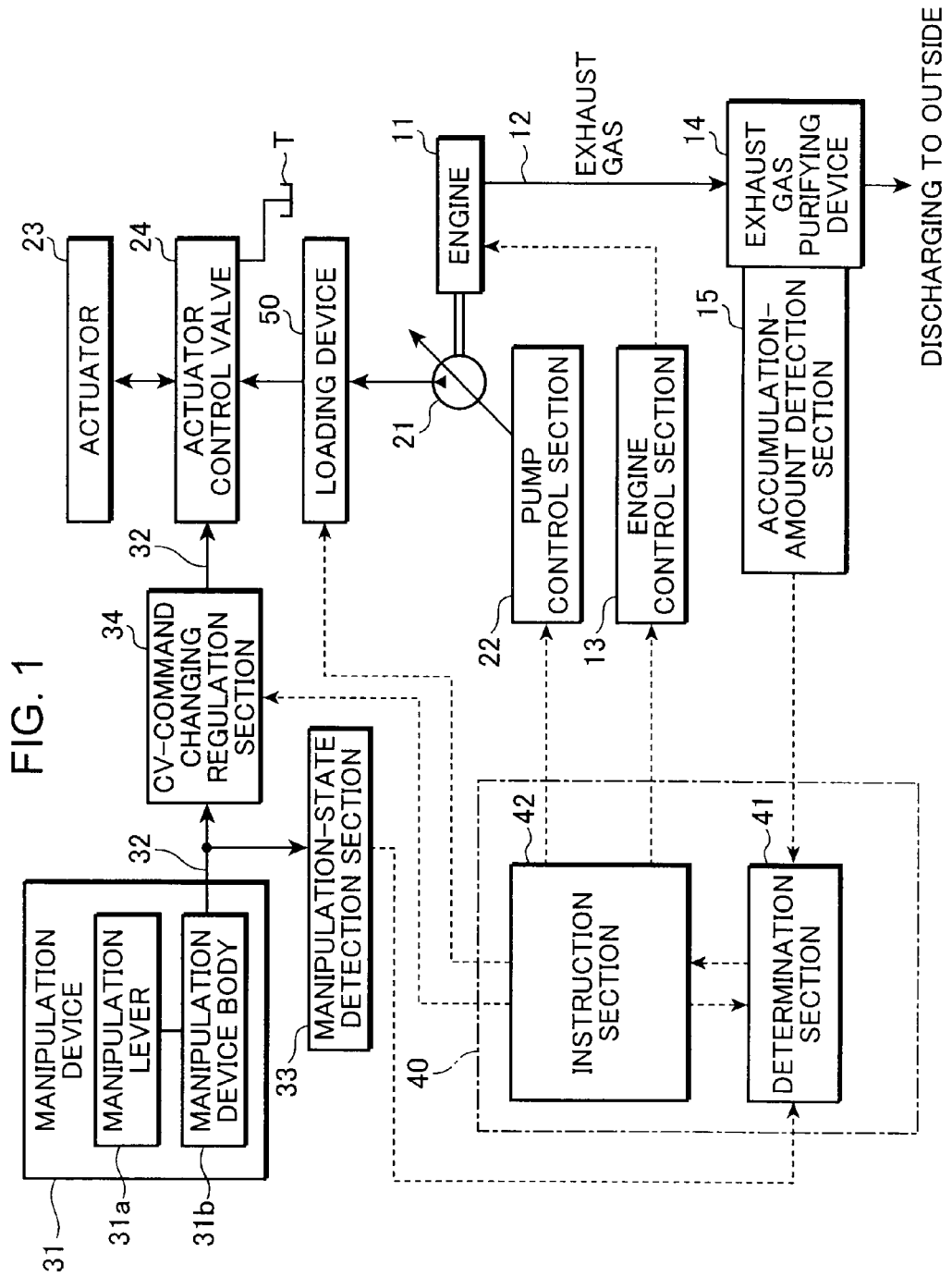
FIG. 1 is a block diagram illustrating a configuration of a construction machine according to one embodiment of the present invention.

With reference to FIGS. 1 to 5, a construction machine according to one embodiment of the present invention will now be described.

The construction machine according to this embodiment may be, for example, a mobile crane. The construction machine comprises an engine 11, an exhaust pipe 12, an engine control section 13, an exhaust gas purifying device 14, an accumulation-amount detection section 15, a pump 21, a pump control section 22, an actuator 23, an actuator control valve 24, a manipulation device 31, a manipulation-state detection section 33, a CV-command changing regulation section 34, a controller 40, and a loading device 50. "CV" means a control valve.

The engine 11 serves as a driving source for the actuator 23. The engine 11 is a diesel engine mounted in the construction machine. The exhaust pipe 12 is connected to the engine 11. Exhaust gas of the engine 11 containing particulate matter is discharged from the engine 11 through the exhaust pipe 12.

The engine control section 13 is designed to control a speed of the engine 11 (engine speed), etc. The engine control section 13 is configured to receive an input of a command for providing an instruction about the speed of the engine 11, from an aftermentioned instruction section 42 of the controller 40. The command to be output from the aftermentioned instruction section 42 to provide an instruction about the speed of the engine 11 will hereinafter be referred to occasionally as "engine speed command". The engine control section 13 is operable to control the speed of the engine 11 in such a manner as to allow an actual value of the speed of the engine 11 to become equal to a value of the engine speed instructed by the command input into the engine control section 13. More specifically, the engine control section 13 is operable to output, to the engine 11, a signal indicative of an engine speed command input from the aftermentioned instruction section 42 into the engine control section 13, to thereby control an actual value of the speed of the engine 11 to become equal to a value of the engine speed instructed by the engine speed command. The engine control section 13 may be configured to control any operating parameter of the engine 11, such as a fuel injection amount, other than the speed of the engine 11.

The exhaust gas purifying device 14 is designed to purify exhaust gas discharged from the engine 11 through the exhaust pipe 12. The exhaust gas purifying device 14 is installed in the exhaust pipe 12. The exhaust gas purifying device 14 comprises a non-illustrated DPF for capturing particulate matter contained in exhaust gas of the engine 11. The DPF is installed in the exhaust pipe 12 to allow exhaust gas discharged from the engine 11 to pass through the DPF. When exhaust gas passes through the DPF, particulate matter contained in the exhaust gas is trapped by the DPF. Subsequently, the exhaust gas subjected to removal of particulate matter is released into the outside environment. The exhaust gas purifying device 14 is configured to regenerate the DPF. The regeneration of the DPF is performed by burning particulate matter accumulated in the DPF so as to allow the accumulated particulate matter to be removed from the DPF. Specifically, during the DPF regeneration, a load is imposed on the engine 11 by the loading device 50 (to be described in detail later) to raise an exhaust temperature of the engine 11, so that particulate matter accumulated in the DPF is burnt.

The accumulation-amount detection section 15 is designed to detect an amount of particulate matter accumulated in the DPF. The accumulation-amount detection section 15 is installed in the exhaust gas purifying device 14. The accumulation-amount detection section 15 is operable to detect a difference between respective pressures before and after the DPF in a direction of an exhaust gas stream flowing through the exhaust pipe 12 (difference between respective pressures on upstream and downstream sides of the DPF). Then, the accumulation-amount detection section 15 is operable to detect the pressure difference before and after the DPF, as an index representing an amount of particulate matter accumulated in the DPF. Specifically, when the pressure difference detected by the accumulation-amount detection section 15 is relatively small, it may be evaluated that the amount of particulate matter accumulated in the DPF is relatively small. On the other hand, when the pressure difference detected by the accumulation-amount detection section 15 is relatively large, it may be evaluated that the amount of particulate matter accumulated in the DPF is relatively large. Subsequently, the accumulation-amount detection section 15 is operable to output the detection result to an aftermentioned determination section 41 of the controller 40.

The pump 21 is a hydraulic pump for discharging hydraulic oil while being driven by the engine 11. The pump 21 is operable to supply hydraulic oil to the actuator 23 via the loading device 50 and the actuator control valve 24. The pump 21 is a variable displacement type. Specifically, the pump 21 is configured such that a discharge rate of hydraulic oil per rotation can be changed by changing a tilting angle of a swash plate of the pump 21.

The pump control section 22 is designed to control an operation of the pump 22. Specifically, the pump control section 22 is operable to control the tilting angle of the swash plate of the pump 21 to control a capacity of the pump 21. The pump control section 22 is configured to receive an input of a tilting-angle control signal from the aftermentioned instruction section 42 of the controller 40. Thus, the pump control section 22 is operable, based on the tilting-angle control signal input thereinto, to operate a non-illustrated tilting-angle adjusting lever of the pump 21 to thereby change the capacity of the pump 21.

Figure 2:
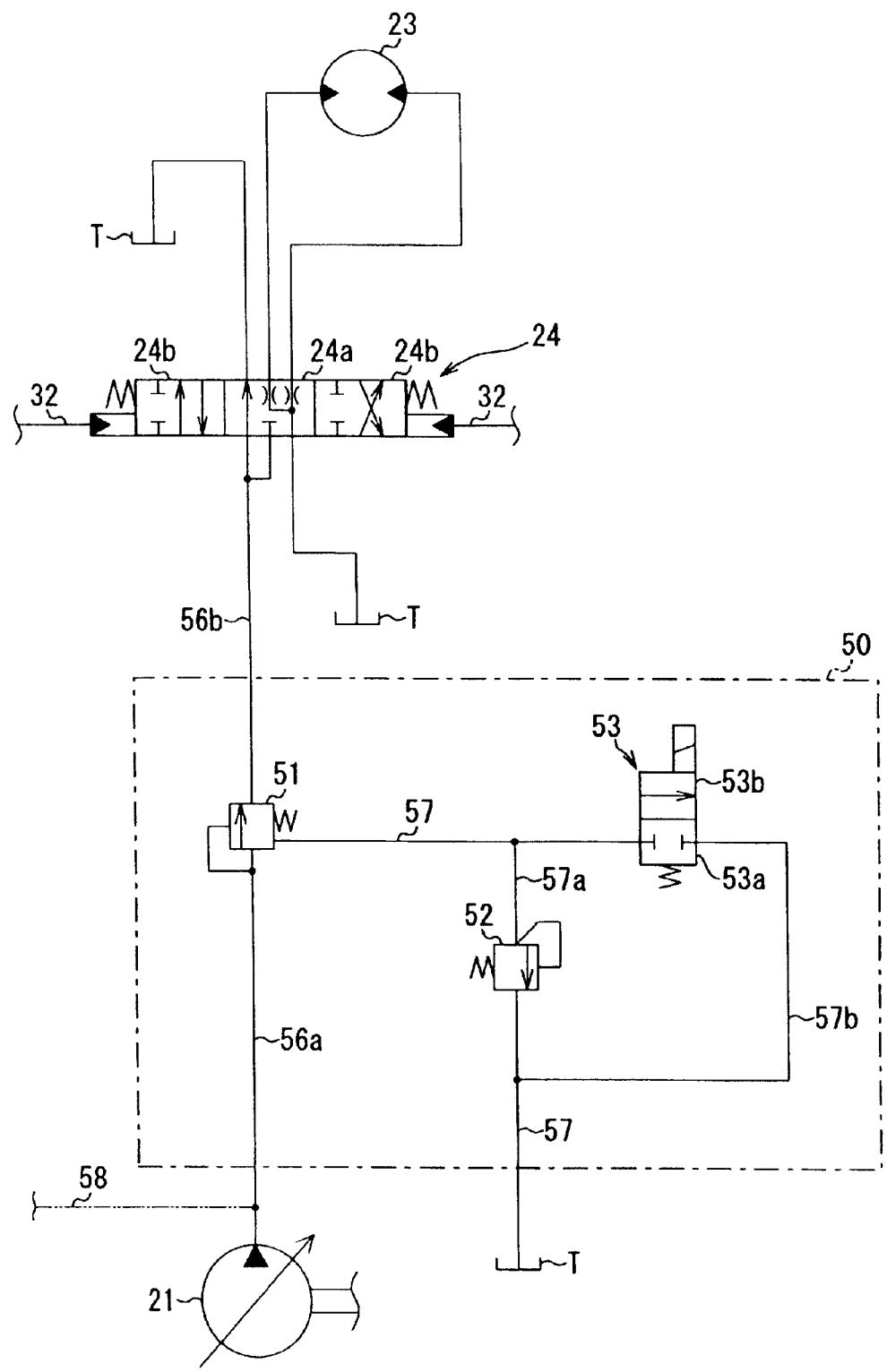
FIG. 2 is a schematic diagram illustrating a hydraulic circuit around a loading device in FIG. 1.

The actuator 23 is a hydraulic actuator adapted to be operated in response to supply of hydraulic oil from the pump 21 thereto. More specifically, the actuator 23 is connected to a discharge port of the pump 21 via a flow passage, so that hydraulic oil discharged from the discharge port of the pump 21 is supplied to the actuator 23 through the flow passage. The actuator 23 may be, for example, a hydraulic motor, a winch equipped with a hydraulic motor, or a hydraulic cylinder. In FIG. 2, a hydraulic motor is illustrated as an example of the actuator 23. The actuator 23 is connected to the actuator control valve 24. In cases where the construction machine is a mobile crane, the actuator 23 corresponds, for example, to a winch for performing hoist-up/hoist-down of a load, a cylinder or winch for raising and lowering a boom, a cylinder for extending and retracting a boom, a motor for slewing an upper slewing body, or a motor for traveling. In FIG. 2, one actuator 23 is connected to one actuator control valve 24. Alternatively, two or more actuators 23 may be connected to one actuator control valve 24.

The actuator control valve 24 is provided in the flow passage between the pump 21 and the actuator 23. The actuator control valve 24 is also connected to the loading device 50. The actuator control valve 24 is a valve for controlling the operation of the actuator 23. Specifically, it is conceivable to use, as the actuator control valve 24, a three-position directional control valve (see FIG. 2) for performing control of extension and retraction of a cylinder, control of rotation of a motor or winch, etc. The actuator control valve 24 is connected to the manipulation device 31 through a command transfer section 32 (to be described in detail later). Normally, the actuator control valve 24 is configured to be operated according to a command which is indicative of a manipulation direction and a manipulation amount of an aftermentioned manipulation lever 31a, and output from the manipulation device 31. As illustrated in FIG. 2, the actuator control valve 24 has a neutral position 24a, and two non-neutral positions 24b. In this embodiment, the actuator control valve 24 is configured to be switched between the neutral position 24a and one of the two non-neutral positions 24b, according to a pilot pressure (oil pressure) input into the actuator control valve 24 through the command transfer section 32. Alternatively, the actuator control valve 24 may be configured to be switched between the neutral position 24a and one of the two non-neutral positions 24b, according to an electric signal input thereinto, or may be configured to be switched between the neutral position 24a and one of the two non-neutral positions 24b, according to a combination of a pilot pressure and an electric signal input thereinto.

When the actuator control valve 24 is in the neutral position 24a, it does not allow hydraulic oil discharged from the pump 21 to be supplied to the actuator 23. Typically, the actuator control valve 24 is configured to be set to the neutral position 24a when the aftermentioned manipulation lever 31a (see FIG. 1) is in a neutral position. On the other hand, when the actuator control valve 24 is in one of the two non-neutral positions 24b, it allows hydraulic oil discharged from the pump to be supplied to the actuator 23. In other words, when the actuator control valve 24 is in one of the two non-neutral positions 24b, the actuator is placed in an operative state. Normally, when the aftermentioned manipulation lever 31a is manipulated, the actuator control valve 24 is set to one of the non-neutral positions 24b according to the manipulation of the manipulation lever 31a.

The manipulation device 31 is designed to be used for manually controlling the actuator 23. The manipulation device 31 is operable to output, to the actuator control valve 24, a command for providing an instruction about an operation of the actuator control valve 24, so as to switchingly operate the actuator control valve 24 between the neutral position 24a and one of the two non-neutral positions 24b to thereby operate the actuator 23. Specifically, the manipulation device 31 comprises a manipulation lever 31a adapted to be manipulated by an operator of the construction machine, and a manipulation device body 31b for outputting a command for providing an instruction about an operation of the actuator control valve 24 according to the manipulation (manipulation direction and manipulation amount) of the manipulation lever 31a.

The manipulation lever 31a is provided in a cab (not illustrated) of the construction machine. The manipulation lever 31a is designed to be manipulated by an operator of the construction machine to provide an instruction about the operation of the actuator 23. The manipulation lever 31a is configured to be set to a neutral position, and tiltingly manipulated from the neutral position toward one of two non-neutral positions located on opposite sides of the neutral position. The "manipulation section" set forth in the appended claims includes, but is not limited to, the manipulation lever 31a or the like.

In this embodiment, the manipulation device body 31b is operable to output, to the actuator control valve 24, a pilot pressure according to the manipulation (manipulation direction and manipulation amount) of the manipulation lever 31a, as the command for providing an instruction about an operation of the actuator control valve 24. In the case where the actuator control valve 24 is configured to be switched between the neutral position 24a and one of the two non-neutral positions 24b, according to an electric signal input thereinto, it is conceivable to use, as the manipulation device body 31b, a type configured to output, to the actuator control valve 24, an electric signal according to the manipulation (manipulation direction and manipulation amount) of the manipulation lever 31a, as the command for providing an instruction about the operation of the actuator control valve 24. On the other hand, in the case where the actuator control valve 24 is configured to be switched between the neutral position 24a and one of the two non-neutral positions 24b, according to the combination of a pilot pressure and an electric signal input thereinto, it is conceivable to use, as the manipulation device body 31b, a type configured to output, to the actuator control valve 24, a combination of an electric signal and a pilot signal according to the manipulation (manipulation direction and manipulation amount) of the manipulation lever 31a, as the command for providing an instruction about the operation of the actuator control valve 24.

The command transfer section 32 is designed to transfer the command output from the manipulation device 31 (manipulation device body 31b) to the actuator control valve 24. The command transfer section 32 interconnects between the manipulation device body 31b and the actuator control valve 24, as mentioned above. In this embodiment, the command transfer section 32 is a pilot flow passage for transferring a pilot pressure from the manipulation device body 31b to the actuator control valve 24. In the case where the manipulation device body 31b is configured to output an electric signal as the command for providing an instruction about the operation of the actuator control valve 24, and the actuator control valve 24 is configured to be switched between the neutral position 24a and one of the two non-neutral positions 24b, according to an electric signal input thereinto, it is conceivable to use, as the command transfer section 32, an electric wire or the like for transferring an electric signal output from the manipulation device body 31b to the actuator control valve 24. On the other hand, in the case where the manipulation device body 31b is configured to output the combination of an electric signal and a pilot signal as the command for providing an instruction about the operation of the actuator control valve 24, and the actuator control valve 24 is configured to be switched between the neutral position 24a and one of the two non-neutral positions 24b, according to the combination of an electric signal and a pilot signal input thereinto, it is conceivable to use, as the command transfer section 32, a combination of an electric wire or the like for transferring an electric signal output from the manipulation device body 31b to the actuator control valve 24, and a pilot flow passage for transferring a pilot pressure output from the manipulation device body 31b to the actuator control valve 24.

The manipulation-state detection section 33 is provided in the command transfer section 32. The manipulation-state detection section 33 is designed to detect the presence or absence of the manipulation of the manipulation lever 31a. In other words, the manipulation-state detection section 33 is operable to detect the presence of the manipulation of the manipulation lever 31a or the absence of the manipulation of the manipulation lever 31a. In this embodiment, the term "presence of the manipulation" means that the manipulation lever 31a is in one of the non-neutral positions, and the term "absence of the manipulation" means that the manipulation lever 31a is in the neutral position. When the manipulation lever 31a is manipulated and set to one of the non-neutral positions for setting the actuator control valve 24 to one of the non-neutral positions 24b to operate the actuator 23, the manipulation-state detection section 33 is operable to detect the presence of the manipulation of the manipulation lever 31a. On the other hand, when the manipulation lever 31a is manipulated and set to the neutral position for setting the actuator control valve 24 to the neutral position 24a to prevent the operation of the actuator 23, the manipulation-state detection section 33 is operable to detect the absence of the manipulation of the manipulation lever 31a.

More specifically, the manipulation-state detection section 33 detects the presence or absence of the manipulation of the manipulation lever 31a, in the following manner. In this embodiment, the command transfer section 32 is composed of a pilot flow passage. Thus, the manipulation-state detection section 33 is configured to detect the presence or absence of the manipulation of the manipulation lever 31a by detecting a pilot pressure in the pilot flow passage. In the case where the command transfer section 32 is composed of an electric wire or the like, it is conceivable to use, as the manipulation-state detection section 33, a type configured to detect the presence or absence of the manipulation of the manipulation lever 31a by detecting an electric signal flowing through the electric wire or the like. The manipulation-state detection section 33 is operable to output a detection result on the presence or absence of the manipulation of the manipulation lever 31a, to the aftermentioned determination section 41 of the controller 40.

The CV-command changing regulation section 34 is provided in the command transfer section 32 between the manipulation device 31 (manipulation device body 31b) and the actuator control valve 24. The CV-command changing regulation section 34 is designed to prohibit changing of a value of a command to be assigned from the manipulation device 31 to the actuator control valve 24 and release of the prohibition, and encompassed in a concept of "command changing regulation section" set forth in the appended claims.

Specifically, the CV-command changing regulation section 34 is configured to be switched between a changing prohibition mode and a changing permission mode, according to an instruction from the aftermentioned instruction section 42 of the controller 40. In the changing prohibition mode, the CV-command changing regulation section 34 is operable to, even if a value of the command to be output from the manipulation device body 31b is changed according to manipulation of the manipulation lever 31a, fix a command which is to be assigned to the actuator control valve 24 (hereinafter referred to as "CV command"), to a value equal to a value of the command to be output from the manipulation device body 31b upon the absence of the manipulation of the manipulation lever 31a. More specifically, in the changing prohibition mode, the CV-command changing regulation section 34 is operable to fix the CV command to a value which causes the actuator control valve 24 to be set to neutral position 24a when the value is input into the actuator control valve 24. In other words, when the CV-command changing regulation section 34 is in the changing prohibition mode, the actuator control valve 24 is fixed to the neutral position 24a even if the manipulation of the manipulation lever 31a is present. On the other hand, in the changing permission mode, the CV-command changing regulation section 34 is operable to permit a value of the CV command which is to be assigned to the actuator control valve 24, to be changed according to changing a value of the command to be output from the manipulation device body 31b. In other words, in the changing permission mode, the CV-command changing regulation section 34 is operable, when a value of the command to be output from the manipulation device body 31b is changed according to the manipulation of the manipulation lever 31a, to assign a CV command having a value equal to the changed value of the command, to the actuator control valve 24. Further, the CV-command changing regulation section 34 is set to the changing prohibition mode according to an instruction from the aftermentioned instruction section 42, during a period where a loading level is transiently changing, and set to the changing permission mode according to an instruction from the aftermentioned instruction section 42, during a period where the loading level is constant, as described in detail later.

In this embodiment, the CV command is a pilot pressure which is output from the manipulation device body 31b to the actuator control valve 24. In the case where an electric signal is output from the manipulation device body 31b to the actuator control valve 24 as a command, a value of the CV command is equivalent to a current value of the electric signal corresponding to the manipulation amount of the manipulation lever 31a indicated by the electric signal. In this embodiment, the command transfer section 32 is composed of a pilot flow passage. Thus, it is conceivable to use, as the CV-command changing regulation section 34, a valve, such as a changeover valve, which is operable to shut off the pilot flow passage in the changing prohibition mode and release shutoff of the pilot flow passage in the changing permission mode. On the other hand, in the case where the command transfer section 32 is composed of an electric wire or the like, it is conceivable to use, as the CV-command changing regulation section 34, a device configured to shut off an electric signal flowing through the electric wire or the like, or output a given electric signal, in the changing prohibition mode.

The controller 40 is designed to perform an input/output and information processing of various signals, etc. The controller 40 comprises a determination section 41 for performing various determinations, and an instruction section 42 for outputting various instructions to respective sections and devices. The determination section 41 and the instruction section 42 are configured to perform information exchange (input and output) therebetween.

The determination section 41 is operable, based on a detection result input from the accumulation-amount detection section 15, i.e., data about a pressure difference before and after the DPF as an index of an amount particulate matter accumulated in the DPF, to determine whether or not the DPF regeneration should be performed. Specifically, the determination section 41 is operable, when the pressure difference is equal to or greater than a predetermined value, to determine that the necessity of the DPF regeneration is "ON", and, when the pressure difference is less than the predetermined value, to determine that the necessity of the DPF regeneration is "OFF". The "necessity of the DPF regeneration is "ON"" represents that the amount of particulate matter accumulated in the DPF becomes equal to or greater than a certain value, and thereby it becomes necessary to perform the DPF regeneration. On the other hand, the "necessity of the DPF regeneration is "OFF"" represents that the amount of particulate matter accumulated in the DPF is still less than a certain value, and thereby it is unnecessary to perform the DPF regeneration. Alternatively, the determination section 41 may be configured to estimate the amount of particulate matter accumulated in the DPF based on a running status (e.g., running time) of the engine 11, an elapsed time from a date of a last operation for the DPF regeneration, etc., and determine whether the necessity of the DPF regeneration is "ON" or "OFF", based on the estimated amount of accumulated particulate matter. Alternatively, the necessity of the DPF regeneration may be switched between "ON" and "OFF" based on manipulation of a switch by a hand of an operator. Based on the detection result input from the manipulation-state detection section 33, the determination section 41 is also operable to perform various other determinations. Details of the various other determinations by the determination section 41 will be described later.

The instruction section 42 is operable to output various instructions. Specifically, the instruction section 42 is operable to provide an instruction, such as an engine speed command, to the engine control section 13. The instruction section 42 is operable to provide an instruction about a capacity of the pump 21, etc., to the pump control section 22. The instruction section 42 is electrically connected, for example, to an aftermentioned pressure control changeover valve 53 (see FIG. 2) of the loading device 50. In this case, the instruction section 42 is operable to instruct the loading device 50 to perform an operation for loading the engine 11. More specifically, the instruction section 42 is operable to provide an instruction about whether or not changing of the aftermentioned loading level should be started, etc., to the loading device 50. The instruction section 42 is operable to instruct the CV-command changing regulation section 34 to enter one of the changing prohibition mode and the changing permission mode. More specifically, The instruction section 42 is operable, during a period where the aftermentioned loading level is transiently changing, to instruct the CV-command changing regulation section 34 to enter the changing prohibition mode, and, during a period where the aftermentioned loading level is constant, to instruct the CV-command changing regulation section 34 to enter the changing permission mode.

The loading device 50 is connected to the pump 21. The loading device 50 is designed to impose, on the engine 11, a load for raising an exhaust temperature of the engine 11 up to a value at which particulate matter accumulated in the DPF of the exhaust gas purifying device 14 is burnt to allow the DPF to be regenerated. A level of load to be imposed on the engine 11 by the loading device 50 during the DPF regeneration will hereinafter be referred to as "loading level". It is to be noted that any component in performing only an operation unrelated to the DPF regeneration is not involved in the loading device 50, even if the component is a component to load on the engine 11. For example, in a period other than that during the DPF regeneration, the pump 21 is not included in the loading device 50. The loading device 50 is configured to be switched between a first mode where the loading on the engine 11 is performed according to an instruction from the instruction section 42, and a second mode where the loading is not performed.

The loading device 50 illustrated in FIG. 2 is disposed downstream of the pump 21. The loading device 50 is operable to raise a discharge pressure of the pump 21 to thereby load the engine 11. The loading device 50 comprises a first pressure control valve 51, a second pressure control valve 52, a pressure control changeover valve 53, and a pilot flow passage 57.

The first pressure control valve 51 is provided in the flow passage connecting between the pump 21 and the actuator 23 at a position located between the pump 21 and the actuator control valve 24. In other words, the first pressure control valve 51 is provided in a flow passage connecting between the pump 21 and the actuator control valve 24. In the flow passage connecting between the pump 21 and the actuator control valve 24, a region located between the pump 21 and the first pressure control valve 51 will hereinafter be referred to as "flow passage 56a". Further, in the flow passage connecting between the pump 21 and the actuator control valve 24, a region located between the first pressure control valve 51 and the actuator control valve 24 will hereinafter be referred to as "flow passage 56b". The second pressure control valve 52 and the pressure control changeover valve 53 is provided in the pilot flow passage 57. The pilot flow passage 57 is a flow passage for allowing a pilot pressure to be applied to the first pressure control valve 51, and one end of the pilot flow passage 57 is connected to the first pressure control valve 51. The other end of the pilot flow passage 57 is connected to a tank T. The pilot flow passage 57 has two pilot flow passage portions 57a, 57b. Specifically, the pilot flow passage 57 is branched into the two pilot flow passage portions 57a, 57b in an intermediate region thereof. The two pilot flow passage portions 57a, 57b are arranged in parallel to each other in the intermediate region of the pilot flow passage 57. The second pressure control valve 52 is disposed in one 57a of the two pilot flow passage portions 57a, 57b, and the pressure control changeover valve 53 is disposed in the other pilot flow passage portion 57b. Based on this arrangement, the second pressure control valve 52 and the pressure control changeover valve 53 are arranged in parallel relation in the pilot flow passage 57.

The first pressure control valve 51 is a valve for controlling a pressure in the flow passage connecting between the pump 21 and the actuator control valve 24. The first pressure control valve 51 is encompassed in a concept of "pressure control valve" set forth in the appended claims. The first pressure control valve 51 is operable to raise a discharge pressure of the pump 21 during the loading on the engine 11 to load the engine 11 which is driving the pump 21, as described in detail later. The second pressure control valve 52 is a valve for controlling a pressure in a region of the pilot flow passage portion 57a on a side opposite to the tank T with respect to the second pressure control valve 52. It is conceivable to use a relief valve, a pressure reducing valve or the like, as each of the first and second pressure control valves 51, 52.

A set pressure to be set by the first pressure control valve 51 is determined, for example, by a pilot pressure in the pilot flow passage 57, a spring force of a spring comprised in the first pressure control valve 51, etc. The first pressure control valve 51 is configured to, when the discharge pressure of the pump 21 (pressure in the flow passage 56a) is less than the set pressure of the first pressure control valve 51, prohibit hydraulic oil from flowing from the pump 21 to the actuator control valve 24 or restrict the flow.

The first pressure control valve 51 is an externally drained type configured such that a primary pressure of the first pressure control valve 51 is free of an influence of a secondary pressure of the first pressure control valve 51. Specifically, a drain port (not illustrated) of the first pressure control valve 51 is connected to the tank T without passing through the flow passage 56a on a downstream side of the first pressure control valve 51. This configuration allows the primary pressure of the first pressure control valve 51 to become free of the influence of the secondary pressure of the first pressure control valve 51. The primary pressure of the first pressure control valve 51 corresponds to the pressure in the flow passage 56a, the discharge pressure of the pump 21, or a pressure in a region where hydraulic oil flows into the first pressure control valve 51. On the other hand, the secondary pressure of the first pressure control valve 51 corresponds to the pressure in the flow passage 56b, or a pressure in a region where hydraulic oil flows out from the first pressure control valve 51. A flow rate of hydraulic oil flowing into the first pressure control valve 51 is equal to a flow rate of hydraulic oil discharged from the pump 21. In other words, in this embodiment, the flow passage 56a between the pump 21 and the first pressure control valve 51 is not branched. Although a branched flow passage 58 is illustrated in FIG. 2, the flow passage 56a in this embodiment is devoid of the branched flow passage 58. The flow passage 56b on the downstream side of the loading device 50, i.e., the flow passage 56b on the downstream side of the first pressure control valve 51, may be branched. For example, a plurality of actuator control valves 24 may be connected to the downstream side of the loading device 50.

The pressure control changeover valve 53 is a valve for switching whether or not the loading on the engine 11 based on the loading device 50 is performed. Specifically, the pressure control changeover valve 53 is operable to switch whether or not the second pressure control valve 52 functions, to thereby switch whether or not the loading on the engine 11 based on the loading device 50 is performed. The pressure control changeover valve 53 is configured to be switchable between a loading position 53*a* for shutting off the pilot flow passage portion 57*b*, and a non-loading position 53*b* for releasing the shutoff of the pilot flow passage portion 57*b* to apply a pilot pressure to the first pressure control valve 51. When the pressure control changeover valve 53 is set to the loading position 53*a*, a set pressure of the second pressure control valve 52 is applied to the first pressure control valve 51 as a pilot pressure, so that that the first pressure control valve 51 is operated to raise the discharge pressure of the pump 21 (pressure in the flow passage 56*a*), and a load is imposed from the loading device 50 on the engine 11. On the other hand, when the pressure control changeover valve 53 is set to the non-loading position 53*b*, the pilot pressure applied to the first pressure control valve 51 become equal to atmospheric pressure, so that the first pressure control valve 51 is operated to lower the discharge pressure of the pump 21 (pressure in the flow passage 56*a*), and no load is imposed from the loading device 50 on the engine 11.

[Operation of Loading Device and Others]

An operation of the loading device 50 will be described below.

The loading level based on the loading device 50 changes as follows.

(a: During Loading)

Figure 3:
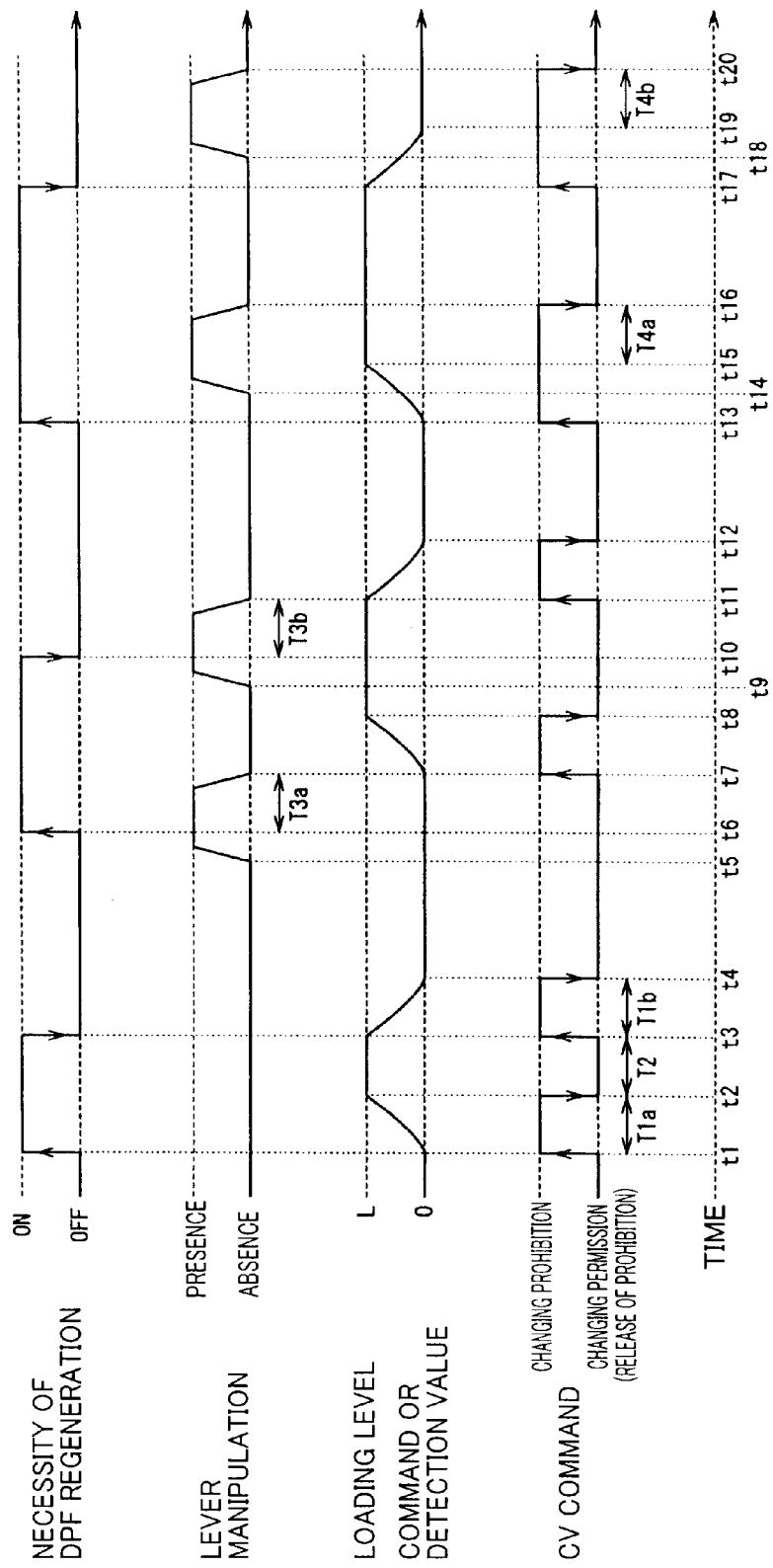
FIG. 3 is an operational time chart of the construction machine illustrated in FIG. 1.

When the loading based on the loading device 50 is started, the loading level will gradually increase from zero, as described in the section "Loading Level Command or Detection Value" in FIG. 3. When the loading level reaches a predetermined value L, the increase in the loading level is finished, and the loading level is kept constant at the predetermined value L.

(b: During Non-Loading)

When the loading based on the loading device 50 is completed, the loading level will gradually decrease from the predetermined value L. When the loading level reaches zero, the decrease in the loading level is finished.

The loading device 50 illustrated in FIG. 2 and others will be operated as follows.

(a: During Loading)

During a period where the loading level is increasing or during a period where the loading level is kept constant at the predetermined value L, the set pressure of the first pressure control valve 51 is raised to a value greater than that during the non-loading, to cause a rise in the discharge pressure of the pump 21. More specifically, when the determination section 41 illustrated in FIG. 1 determines that the necessity of the DPF regeneration is "ON", the instruction section 42 outputs a signal to the pressure control changeover valve 53 illustrated in FIG. 2. Then, in response to receiving the signal, the pressure control changeover valve 53 is switched to the loading position 53*a*. Consequently, the pressure control changeover valve 53 shuts off the pilot flow passage portion 57*b*, and the second pressure control valve 52 shuts off the pilot flow passage portion 57*a*. Thus, the pilot pressure applied to the first pressure control valve 51 through the pilot flow passage 57 becomes greater than a pressure (atmospheric pressure) in the tank T. Therefore, the set pressure of the first pressure control valve 51 is raised, and accordingly the pressure in the flow passage 56*a*, i.e., the discharge pressure of the pump 21, is raised up to the raised set pressure of the first pressure control valve 51.

Along with the raising of the discharge pressure of the pump 21, a load imposed on the engine 11 (see FIG. 1) driving the pump 21 is increased, and accordingly an exhaust temperature (exhaust gas temperature) of the engine 11 is raised. This causes particulate matter accumulated in the DPF of the exhaust gas purifying device 14 to be burnt and removed. In other words, the DPF regeneration is performed.

(b: During Non-Loading)

During a period where the loading level is maintained at zero or reduced, the loading device 50 performs an operation reverse to that during the loading. Specifically, when the determination section 41 illustrated in FIG. 1 determines that the necessity of the DPF regeneration is "OFF", the pressure control changeover valve 53 illustrated in FIG. 2 is switched to the non-loading position 53*b*. Consequently, the pilot pressure applied to the first pressure control valve 51 through the pilot flow passage 57 becomes equal to the pressure (atmospheric pressure) in the tank T. Thus, the set pressure of the first pressure control valve 51 is lowered to a value less than that during the loading, and accordingly the pressure in the flow passage 56*a*, i.e., the discharge pressure of the pump 21, is lowered to a value equal to the lowered set pressure of the first pressure control valve 51. Therefore, the load imposed on the engine 11 driving the pump 21 is reduced.

The determination section 41 makes a determination on whether or not a transient change in the loading level is finished, in the following manner.

For example, the determination section 41 may make the above determination based on an elapsed time from start of the loading. Specifically, when a length of time when the instruction section 42 outputs, to the loading device 50, an instruction indicating to perform or stop performing the loading, reaches a given value, the determination section 41 may determine (estimate) that "the transient change in the loading level is finished".

Alternatively, the determination section 41 may make the above determination based on a loading level directly detected by a detection section (not illustrated). Specifically, for example, a pressure meter (not illustrated) may be provided in the flow passage 56*a* illustrated in FIG. 2 to detect the discharge pressure of the pump 21. In this case, when a detection value from the pressure meter becomes equal to a predetermined value (a value corresponding to the loading level L), the determination section 41 may determine that "the transient change in the loading level is finished".

[Examples of Modification of Loading Device]

The loading device may have any configuration capable of loading the engine 11 for the DPF regeneration. For example, the loading device may include the following types.

(1) The loading device may be a type configured to load the engine 11 by increasing a driving force required for the operation of the pump 21. For example, the loading device may be configured to raise the discharge pressure of the pump using a mechanism other than that illustrated in FIG. 2. Alternatively, the loading device may be configured to increase the driving force required for the operation of the pump 21 by increasing the capacity of the pump 21 illustrated in FIG. 1. Specifically, the instruction section 42 may be configured to output, to the pump control section 22, an instruction for increasing the capacity of the pump 21.

(2) The loading device may be a type configured to load the engine 11 by increasing a speed of the engine 11. In a construction machine according to an aftermentioned modified embodiment, the loading based on increasing the speed of the engine 11 is not performed.

(3) The loading device may be a type configured to load the engine 11 by increasing an exhaust back pressure of the engine 11. For example, the loading device may be configured to increase the exhaust back pressure of the engine 11 by narrowing an exhaust gas flow passage in an exhaust system of the engine 11.

(4) The loading device may be a device (not illustrated) provided separately from the pump 21 and installed to an output shaft of the engine 11 to produce a rotational resistance as required. In this case, the loading device may be configured to give a rotational resistance to the output shaft of the engine 11 during the DPF regeneration to thereby load the engine 11. For example, the device capable of producing a rotational resistance for the output shaft of the engine 11 may include a hydraulic rotation device, such as a hydraulic motor or a hydraulic pump, or a rotary electric machine, such as a generator or an electric motor.

In the above modifications, the determination on whether the transient change in the loading level is finished is made in the following manner.

For example, based on an elapsed time from start of the loading, the determination section 41 may make the determination on whether the transient change in the loading level is finished (see above).

Alternatively, based on a detection value from a sensor (not illustrated), the determination section 41 may make the determination on whether the transient change in loading level is finished. Specifically, in the modification (1), the sensor may be configured to detect the discharge pressure or discharge rate of the pump 21. In the modification (2), the sensor may be configured to detect the speed of the engine 11. In the modification (3), the sensor may be configured to detect a narrowed amount of the exhaust system, such as the exhaust pipe 12. In the modification (4), the sensor may be configured to detect a moving amount, a generated energy amount or the like of the device serving as a rotational resistance. Then, the determination section 41 may be configured to make the above determination based on a detection value from the sensor.

[Operation of Construction Machine Concerning Loading on Engine]

Figure 4:
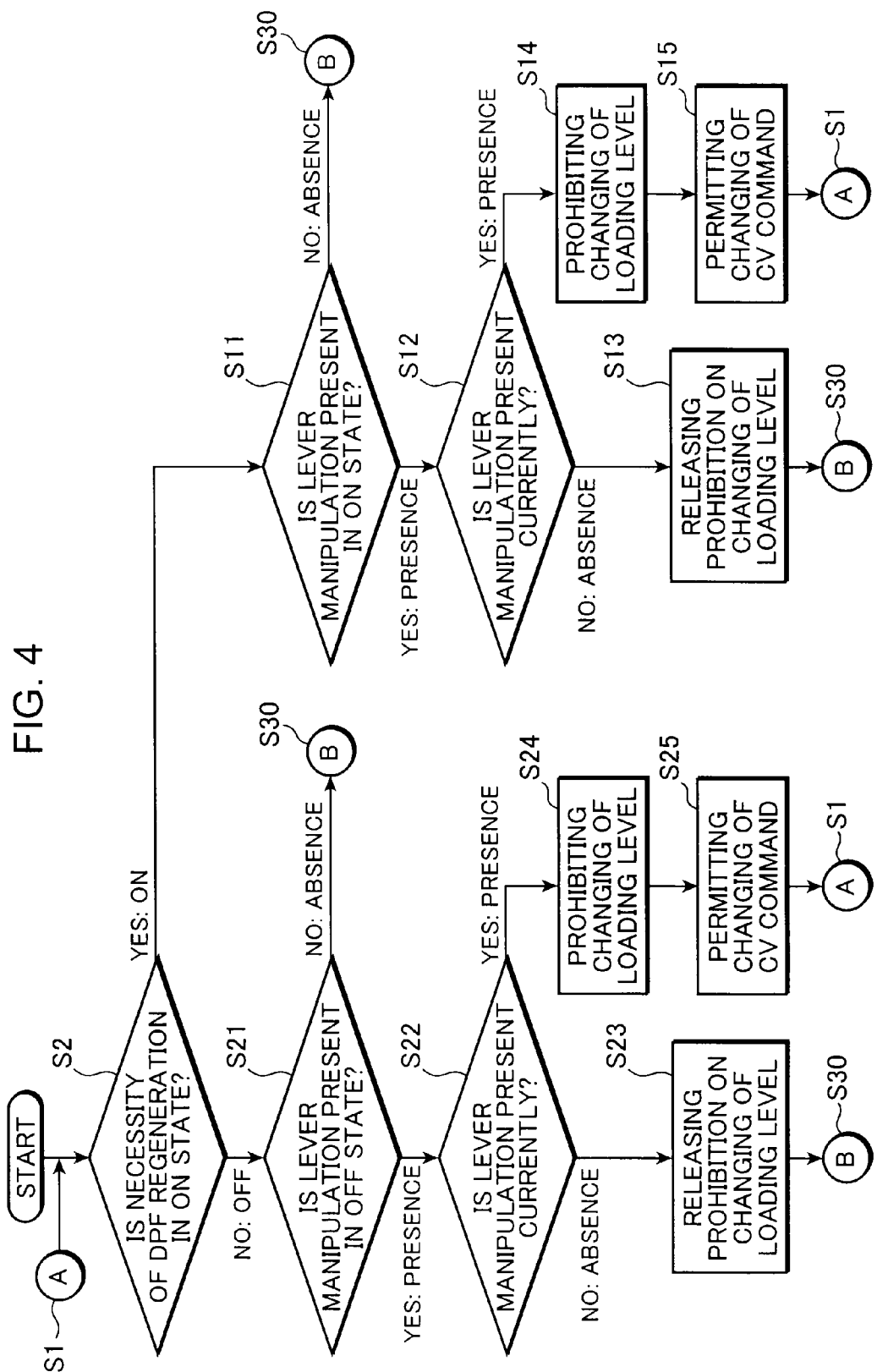
FIG. 4 is an operational flow chart of the construction machine illustrated in FIG. 1.

Primarily with reference to the time chart illustrated in FIG. 3 and the flowcharts illustrated in FIGS. 4 and 5, an operation of the construction machine concerning the loading on the engine 11 will be described below. In the following description, as to the aforementioned physical components, an aftermentioned period between Time t1 to Time t20, an aftermentioned process of Steps S2 to S25, and an aftermentioned process of Steps S31 to S38, refer to FIGS. 1 and 2, FIG. 3, FIG. 4 and FIG. 5, respectively. FIG. 4 and FIG. 5 are two divided parts of one flowchart, respectively. When the process advances to the connector A (S1) illustrated in FIGS. 4 and 5, the process will return to Step S2 illustrated in FIG. 4. On the other hand, when the process advances to the connector B (S30) illustrated in FIG. 4, the process will return to Step S31 illustrated in FIG. 5.

An outline of the operation of the construction machine concerning the loading on the engine 11 will be first described. In this loading operation of the construction machine, when both of the manipulation of the manipulation lever 31a, and the changing of the loading level based on the loading device 50 are performed, one of the lever manipulation and the loading level changing which is started at an earlier timing, is prioritized.

During a period where the loading level based on the loading device 50 is transiently changing as indicated by the code T1a and the code T1b in FIG. 3 (see the section "Loading Level Command or Detection Value" in FIG. 3), the CV-command changing regulation section 34 is set to the changing prohibition mode for fixing the CV command to a value equal to a value of the command to be output from the manipulation device body 31b upon the absence of the manipulation of the manipulation lever 31a, according to an instruction from the instruction section 42 (see the section "CV command" in FIG. 3). In other words, the CV-command changing regulation section 34 is operable, during the period where the loading level is transiently changing, to prohibit a value of the CV command from being changed according to the manipulation of the manipulation lever 31a, even if the manipulation of the manipulation lever 31a is present.

On the other hand, during a period where the loading level based on the loading device 50 is constant as indicated by the code T2 in FIG. 3, the CV-command changing regulation section 34 is set to the changing permission mode for permitting a value of the CV command to be changed according to changing a value of the command to be output from the manipulation device body 31b, according to an instruction from the instruction section 42. In other words, the CV-command changing regulation section 34 is operable, during the period where the loading level is constant, to release the prohibition on changing of a value of the CV command according to the manipulation of the manipulation lever 31a.

Further, during a period where the manipulation-state detection section 33 detects the presence of the manipulation of the manipulation lever 31a as indicated by the code T3a and the code T3b in FIG. 3 (see the section "Lever Manipulation" in FIG. 3), the instruction section 42 is operable to prohibit the loading device 50 from changing the loading level. In other words, the instruction section 42 is operable, during the period where the manipulation-state detection section 33 detects the presence of the manipulation of the manipulation lever 31a, to prohibit the loading device 50 from starting changing the loading level, until the manipulation-state detection section 33 detects the absence of the manipulation of the manipulation lever 31a.

On the other hand, when the manipulation-state detection section 33 detects the presence of the manipulation of the manipulation lever 31a during the period where the loading level based on the loading device 50 is transiently changing, the CV-command changing regulation section 34 is maintained in the changing prohibition mode, until the manipulation-state detection section 33 subsequently detects the absence of the manipulation of the manipulation lever 31a, even after the loading level based on the loading device 50 becomes constant (see zones indicated by the code T4a and the code T4b in FIG. 3). The operation of the construction machine concerning the loading on the engine 11 will be described in detail below.

(Times t1 to t4)

The operation will be first described in a situation where the necessity of the DPF regeneration is switched between "ON" and "OFF" during the manipulation of the manipulation lever 31a is absent (see the zones indicated by the codes T1a, T1b and T2 in FIG. 3).

At Time t1, the necessity of the DPF regeneration is shifted from "OFF" to "ON" under the absence of the manipulation of the manipulation lever 31a. In this case, in the process illustrated in FIG. 4, a determination in Step S2 is made to be YES, and a determination in Step S11 is made to be NO. Thus, the loading device 50 starts to increase (change) the level of loading on the engine 11 (Step S31 in FIG. 5). At this timing, the manipulation of the manipulation lever 31a is absent, so that the actuator control valve 24 is in the neutral position 24a, and therefore the actuator 23 is not operated.

During a period between Time t1 and Time t2 (period after Time t1 and before Time t2), the loading level increases (changes) up to the target value L under the absence of the manipulation of the manipulation lever 31a. During this period, the CV-command changing regulation section 34 prohibits the changing of the CV command (see the zone indicated by the code T1a in FIG. 3). In this case, the process in FIG. 5 advances to Step S37 via Steps S31, S32 and S36. In the following description, detailed description of some Steps in the flow chart will be appropriately omitted for avoiding complexity in explanation. Based on the prohibition on changing of the CV command during the above period, the actuator control valve 24 is maintained in the neutral position 24a, and the actuator 23 is in an inoperative state.

At Time t2, the increase (change) in the loading level is finished, and the loading level is set to the predetermined value L. At this timing, the determination section 41 determines that "the transient change in the loading level is finished".

During a period between Time t2 and Time t3 (period after Time t2 and before Time t3), the loading level is kept constant at the predetermined value L. During this period, the CV-command changing regulation section 34 releases the prohibition on changing of the CV command (see the zone indicated by the code T2 in FIG. 3). In this case, a determination in Step S11 illustrated in FIG. 4 is made to be NO, and then the process advances to Step S38 in FIG. 5. Based on the release of the prohibition on changing of the CV command during the above period, the actuator control valve 24 becomes shiftable to one of the non-neutral positions 24b, and therefore the actuator 23 becomes operative.

During a period between Time t3 and Time t4 (period after Time t3 and before Time t4), the loading level gradually decreases, and the actuator 23 is placed in the inoperative state during the decrease, in the same manner as that during the period between Time t1 and Time t2. Specifically, at Time t3, the necessity of the DPF regeneration is shifted from "ON" to "OFF" under the absence of the manipulation of the manipulation lever 31a. Then, during the period between Time t3 and Time t4, the loading device 50 reduces (changes) the loading level, and the CV-command changing regulation section 34 prohibits the changing of the CV command (see the zone indicated by the code T1b in FIG. 3). In this case, a determination in Step S21 illustrated in FIG. 4 is made to be NO, and thereby the process advances to Step S37 in FIG. 5. In the following description, unless otherwise noted, a "period between Time tn and Time tm" is defined as a "period after Time tn and before Time tm".

(Times t5 to t12)

The operation will be further described in a situation where the necessity of the DPF regeneration is switched between "ON" and "OFF" during the presence of the manipulation of the manipulation lever 31a (see the zones indicated by the codes T3a and T3b in FIG. 3).

During a period between Time t5 and Time t7, the manipulation of manipulation lever 31a is present. At Time t6, the necessity of the DPF regeneration is shifted from "OFF" to "ON" under the presence of the manipulation of the manipulation lever 31a. Then, differently from the period between Time t1 and Time t2, during a period between Time t6 and Time T7, the loading device 50 is prohibited from starting to increase the loading level (see the zone indicated by the code T3a in FIG. 3). In this case, the process in FIG. 4 advances to Step S14 via Steps S11 and S12. During this period, the CV-command changing regulation section 34 maintains the state in which the prohibition on changing of the CV command is released (Step S15 in FIG. 4). Thus, during this period, the actuator 23 is in the operative state.

At Time t7, the manipulation of the manipulation lever 31a becomes absent under "ON" of the necessity of the DPF regeneration. At this timing, the restriction on start of the increase in the loading level is released (Step S13 in FIG. 4). In other words, the increase in the loading level is started after the manipulation of the manipulation lever 31a becomes absent and therefore the actuator 23 is placed in the inoperative state.

During a period between Time t7 and Time t8 (period after Time t7 and before Time t8), the same operation as that during the period between Time t1 and Time t2 is performed in the construction machine. In this case, the process advances to Step S13 in FIG. 4, and then advances to Step S37 in FIG. 5. During a period between Time t8 and Time t9, the same operation as that during the period between Time t2 and Time t3 is performed in the construction machine.

During a period between Time t9 and Time t11, a decrease in the loading level is started after the manipulation of the manipulation lever 31a becomes absent, in much the same way as the operation performed during the period between Time t6 and Time t7 (see the zone indicated by the code T3a in FIG. 3).

Specifically, at Time t10, the necessity of the DPF regeneration is shifted from "ON" to "OFF" under the presence of the manipulation of the manipulation lever 31a. Differently from the period between Time t3 and Time t4, during a period between Time t10 and Time T11, the loading device 50 is prohibited from starting to reduce the loading level (see the zone indicated by the code T3b in FIG. 3). During this period, the CV-command changing regulation section 34 maintains the state in which the prohibition on changing of the CV command is released. In this case, the process advances to Step S25 via Steps S22 and S24 in FIG. 4.

At Time t11, the manipulation of the manipulation lever 31a becomes absent under "OFF" of the necessity of the DPF regeneration. At this timing, the prohibition on start of the reduction in the loading level is released (Step S23 in FIG. 4).

During a period between Time t11 and Time t12 (period after Time t11 and before Time t12), the same operation as that during the period between Time t3 and Time t4 is performed in the construction machine. In this case, the process advances to Step S37 in FIG. 5 via Step S23 in FIG. 4.

(Times t13 to t20)

The operation will be further described in a situation where the manipulation lever 31a is manipulated during a period where the loading level is transiently changing (see the zones indicated by the codes T4a and T4b in FIG. 3).

During a period between Time t13 and Time t14, the same operation as that during the period between Time t1 and Time t2 is performed in the construction machine.

During a period between Time t13 and Time t15, the loading device 50 increases the loading level. During a period between Time t14 and Time t15, i.e., during a period where the loading level is transiently increasing (transiently changing), the manipulation lever 31a is manipulated. During the period between Time t14 and Time t15, the CV-command changing regulation section 34 prohibits the changing of the value of the CV command, in the same manner as that during the period between Time t1 and Time t2. In this case, the determination in Step S11 illustrated in FIG. 4 is made to be NO, and then the process advances to Step S35 via Steps S32 and S33 in FIG. 5.

During a period between Time t15 and Time t16, the loading level is kept constant at the predetermined value L. In this period, the manipulation lever 31a is manipulated continuously with the period between Time t14 and Time t15. Differently from the period between Time t2 and Time t3, during the period between Time t15 and Time t16, the CV-command changing regulation section 34 maintains the state in which the changing of the CV command is prohibited (see the zone indicated by the code T4a in FIG. 3). During this period, the determination in Step S11 illustrated in FIG. 4 is made to be NO, and then the process advances to Step S35 in FIG. 5. Further, during this period, although the loading level is kept constant at the predetermined value L, the actuator 23 is maintained in the inoperative state due to the prohibition on changing of the CV command.

At Time t16, the manipulation of the manipulation lever 31a becomes absent. At this timing, the CV-command changing regulation section 34 releases the prohibition on changing of the CV command. In other words, at Time t16, the actuator 23 is shifted from the inoperative state to the operative state. In this case, the determination in Step S11 illustrated in FIG. 4 is made to be NO, and then the process advances to Step S34 via Steps S31, S32 and S33 in FIG. 5.

During a period between Time t16 and Time t17, the same operation as that during the period between Time t2 and Time t3 is performed in the construction machine.

During a period between Time t17 and Time t19, the manipulation lever 31a is manipulated during a period where the loading level is transiently decreasing, in approximately the same manner as that during the period between Time t13 and Time t15. During a period between Time t18 and Time t19, the CV-command changing regulation section 34 prohibits the changing of the CV command in the same manner as that during the period between Time t3 and Time t4. During this period, the determination in Step S21 illustrated in FIG. 4 is made to be NO, and then the process advances to Step S35 via Steps S31, S32 and S33 in FIG. 5.

During a period between Time t19 and Time t20, the actuator 23 is shifted from the inoperative state to the operative state, in the same manner as that during a period between Time t15 and Time t16 (see the zone indicated by the code T4a in FIG. 3). In other words, during a period between Time t19 and t20, the loading level is zero. In this period, the manipulation lever 31a is manipulated continuously with the period between Time t18 and Time t19. Differently from the period between Time t4 and Time t5, during the period between Time t19 and Time T20, the CV-command changing regulation section 34 maintains the state in which the changing of the CV command is prohibited (see the zone indicated by the code T4b in FIG. 3). During this period, the determination in Step S21 illustrated in FIG. 4 is made to be NO, and then the process advances to Step S35 via Steps S31, S32 and S33 in FIG. 5.

ADVANTAGEOUS EFFECTS

Advantageous Effects I-I and II-I

In the configuration of the construction machine illustrated in FIG. 1, the following advantageous effects can be obtained. In the above construction machine, during the period where the manipulation-state detection section 33 detects the presence of the manipulation of the manipulation lever 31a, the loading device 50 is prohibited from starting to change (increase or reduce) the loading level (see the zones indicated by the codes T3a and T3b in FIG. 3). In other words, the changing of the loading level is started under the absence of the manipulation of the manipulation lever 31a (see Times t1, t3, t7 and t11 in FIG. 3). Thus, when the changing of the loading level is started, the actuator control valve 24 is placed in a state precluding operation of the actuator 23, i.e., is set to the neutral position 24a (see FIG. 2) (Function α-1).

In the above embodiment, during the period where the loading level based on the loading device 50 is transiently changing, the CV-command changing regulation section 34 is controlled to fix the CV command to a value equal to a value of the command to be output from the manipulation device body 31b upon the absence of the manipulation of the manipulation lever 31a (see the zones indicated by the codes T1a and T1b, the period between Time t7 and Time t8, and the period between Time t11 and Time t12, in FIG. 3). Thus, during the period where the loading level is transiently changing, the actuator control valve 24 is maintained in a state just before start of the changing of the loading level, i.e., in the neutral position 24a (see FIG. 2). Therefore, during the period where the loading level is transiently changing, the actuator 23 is not operated (Function α-2).

In this connection, assuming that the actuator 23 is operated during the period where the level of loading on the engine 11 is transiently changing, a problem occurring in this situation will be described below. When the level of loading on the engine 11 by the loading device 50 is changed (increased or reduced), a torque resistance (load) imposed on the engine 11 is changed, so that the speed of the engine 11 is changed (raised or lowered). Thus, a speed of the pump 21 driven by the engine 11 is changed (reduced or increased), so that the discharge rate of the pump 21 is changed. Then, the operation of the actuator 23 supplied with hydraulic oil from the pump 21 is changed (decelerated or accelerated). Particularly, if the loading level is suddenly changed, the speed of the engine 11 is suddenly changed, i.e., quickly lowered or quickly raised. In this case, the operation of the actuator 23 is suddenly changed. Specifically, the actuator 23 in operation is suddenly decelerated or stopped, or suddenly activated or accelerated. Therefore, the sudden change in the loading level is undesirable in view of safety in construction work. For example, in a crane using the actuator 23 as a load-hoisting winch of a crane, a hoisting and lowering work is performed while manually controlling the actuator 23 to allow the actuator 23 to be operated at very low speed, in some cases. A sudden change in the operation of the actuator 23 during such hoisting and lowering work is particularly unsafe. In contrast, in the above embodiment, the actuator 23 is not operated during the period where the loading level is transiently changing, as mentioned above, so that the above unsafe situation never occurs.

In the above embodiment, during the period where the loading level based on the loading device 50 is kept constant at the predetermined value L, the CV-command changing regulation section 34 is controlled to release the prohibition on changing of the CV command based on the manipulation lever 31a (see the zone indicated by the code T2, and the period between Time t8 and Time t11, in FIG. 3). During the period where the loading level is constant, the (aforementioned) change in operation of the actuator 23 due to a change in the loading level never occurs (Function β).

The function α-1 and the function β, or the function α-2 and the function β, make it possible to suppress the occurrence of a situation where the actuator 23 is operated in a manner unexpected by an operator of the construction machine (in an unsafe manner), during the DPF regeneration (see, for example, the period between Time t1 and Time t4 and the period between Time t7 and Time t12 in FIG. 3).

Advantageous Effects I-II and II-II

In the above embodiment, during the period where the loading level based on the loading device 50 is kept constant at the predetermined value L or the zero value, the CV-command changing regulation section 34 is controlled to permit a value of the CV command to be changed according to changing a value of the command to be output from the manipulation device body 31*b* (see the zone indicated by the code T2, and the period between Time t8 and Time t11, in FIG. 3). Thus, as compared to cases where the CV-command changing regulation section 34 is configured to continue the prohibition on changing of the CV command value, irrespective of a state of the loading level based on the loading device 50, it becomes possible to reduce a period of time where the changing of the CV command is prohibited, during a period where the loading is performed by the loading device 50 (e.g., the period between Time t1 and Time t4). This makes it possible to shorten a waiting time, i.e., a period of time where an operator has to wait while stopping the actuator 23, due to the DPF regeneration.

Advantageous Effect III

In the above embodiment, when the manipulation-state detection section 33 detects the presence of the manipulation of the manipulation lever 31*a* during the period where the loading level based on the loading device 50 is transiently changing (see the period between Time t13 and Time t15 and the period between Time t17 and Time t19 in FIG. 3) (see Time t14 and t18 in FIG. 3), the CV-command changing regulation section 34 is maintained in the CV-command changing prohibition mode, until the manipulation-state detection section 33 subsequently detects the absence of the manipulation of the manipulation lever 31*a* (see Times t16 and t20), even after the loading level based on the loading device 50 is kept constant at the predetermined value L or the zero value (see the zones indicated by the codes T4*a* and T4*b* in FIG. 3). This makes it possible to suppress the occurrence of a situation where the actuator 23 is suddenly activated immediately after release of the prohibition on changing of the CV command.

This point will be described in more detail. As mentioned above, during the period where the loading level is transiently changing, the actuator 23 is in the inoperative state as illustrated in the zone indicated by the codes T1*a* and T1*b* in FIG. 3. However, it is possible to manipulate the manipulation lever 23, and more specifically to simply move the manipulation lever 3 without causing respective operations of the actuator control valve 24 and the actuator 23. Assuming that the restriction on changing of the CV command is released at the time (see Times t15 and t19) the transient change in the loading level is finished under the presence of the manipulation of the manipulation lever 31*a*, the actuator control valve 24 is operated immediately after the release, and set to one of the non-neutral positions 24*b* (see. FIG. 2), so that the actuator 23 is suddenly activated. Thus, the operation of the actuator 23 is started at a timing different from the timing when an operator starts moving the manipulation lever 31*a* (see Time t14 and Time t18). This is undesirable in view of safety in construction work. In contrast, in the above embodiment, the restriction on changing on the CV command is released after the manipulation of the manipulation lever 31*a* becomes absent (see the zones indicated by the codes T4*a* and T4*b*), such unsafe situation will never occur.

Advantageous Effect IV

The loading device 50 illustrated in FIG. 2 comprises the first pressure control valve 51 disposed between the pump 21 and the actuator control valve 24 and interposed between the flow passages 56*a*, 56*b*. The flow passage 56*a* connecting between the pump 21 and the first pressure control valve 51 is configured such that the discharge rate of the pump 21 become equal to an inflow rate of the first pressure control valve 51. In other words, in the above embodiment, the flow passage 56*a* is not branched. Assuming that the loading based on the loading device 50 is performed in a situation where the flow passage 56*a* is branched, i.e., the flow passage 56*a* is provided with a branched flow passage 58 indicated by the two-dot chain line in FIG. 2, hydraulic oil flowing toward the first pressure control valve 51 before start of the loading becomes more likely to flow into the branched flow passage 58. Consequently, a flow rate of hydraulic oil flowing into the actuator 23 via the loading device 50 and the actuator control valve 24 is reduced as compared with that before start of the loading. Thus, an operating speed of the actuator 23 is lowered as compared with that before start of the loading. In contrast, in the above embodiment, the flow passage 56*a* is not branched, so that it becomes possible to suppress lowering in the operating speed of the actuator 23, i.e., deterioration in performance of the actuator 23, due to the loading.

Advantageous Effect V

In the above embodiment, the first pressure control valve 51 is an externally drained type. Specifically, it is configured such that a pressure in the flow passage 56*a* on an inlet side of the first pressure control valve 51 (a primary pressure controlled by the first pressure control valve 51 and the discharge pressure of the pump 21) is free of an influence of a pressure in the flow passage 56*b* on an outlet side of the first pressure control valve 51. Thus, a load to be imposed on the pump 21 by the loading device 50, i.e., the discharge pressure of the pump 21, is free of an influence of a state of pressure in the flow passage 56*b* due to respective operating states of the actuator 23 and the actuator control valve 24.

[Modification]

The construction machine according to the above embodiment may be modified as follows. The following description will be made primarily about a difference between the construction machine according to the above embodiment and a construction machine as one example of modification thereof (modified embodiment).

In the construction machine according to the above embodiment, one of the manipulation of the manipulation lever 31*a* and the changing of the loading level which is started at an earlier timing, is prioritized. Differently, in the construction machine according to the modified embodiment, in some aspects, a higher priority is placed one of manipulation of an aftermentioned accelerator section 131*a*, and changing of the loading level which is started at an earlier timing.

In the construction machine according to the above embodiment, the CV-command changing regulation section 34 is controlled to, under a specific condition, prohibit the changing of the command for the actuator control valve 24 (CV command) according to the manipulation lever 31*a*. Differently, in the construction machine according to the modified embodiment, an aftermentioned engine-speed changing regulation section 134 is controlled to, under a specific condition, prohibit changing of a command regarding the speed of the engine 11 (hereinafter referred to occasionally as "engine speed command") according to the aftermentioned accelerator section 131a.

Specifically, as illustrated in FIG. 6, the construction machine according to the modified embodiment comprises an accelerator device 131 for outputting a command regarding the speed of the engine 11. The accelerator device 131 in the modified embodiment is encompassed in a concept of "manipulation device" set forth in the appended claims. The accelerator device 131 is provided in a cab (not illustrated) of this construction machine, and comprises an accelerator section 131a adapted to be manipulated by an operator, and an accelerator device body 131b for outputting a command regarding the speed of the engine 11 according to manipulation of the accelerator section 131a. The accelerator section 131a is encompassed in a concept of "manipulation section" set forth in the appended claims. For example, the accelerator section 131a may be an accelerator pedal or may be an accelerator grip. The accelerator grip is a turnable input device provided, for example, on a distal end of the manipulation lever 31a. The accelerator device body 131b is operable to output a command regarding the speed of the engine 11 according to the manipulation of the accelerator section 131a to provide an instruction about the speed of the pump 21 accordingly. The instruction about the speed of the pump 21 provides an instruction about the discharge rate of the pump 21, which provides an instruction about the operating speed of the actuator 23.

In the modified embodiment, the controller 40 comprises the instruction section 42, a determination section 133, and an engine-speed changing regulation section 134. The accelerator device body 131b is operable to output a command regarding the speed of the engine 11 to the determination section 133, and the instruction section 42 is operable to output the command regarding the speed of the engine 11, to the engine control section 13 through the engine-speed changing regulation section 134.

In the modified embodiment, the determination section 133 is operable to detect the presence or absence of the manipulation of the accelerator section 131a. Thus, in the modified embodiment, the determination section 133 is encompassed in a concept of "manipulation-state detection section" set forth in the appended claims. Alternatively, the presence or absence of the manipulation of the accelerator section 131a may be detected by a manipulation-state detection section (not illustrated) provided separately from the controller 40. In the modified embodiment, the term "presence of the manipulation" of the accelerator section 131a means that the manipulation of the accelerator section 131a for changing the speed of the engine 11 is present, i.e., manipulation of the accelerator section 131a for changing the operating speed of the actuator 23 is present. The term "absence of the manipulation" of the accelerator section 131a means that the manipulation of the accelerator section 131a for changing the speed of the engine 11 is absent. For example, in cases where the accelerator section 131a is an accelerator pedal, the determination section 133 is operable, when the accelerator pedal is depressed by an operator, to detect the "presence of the manipulation", and, when the accelerator pedal is not depressed (accelerator-off state), to detect the "absence of the manipulation". On the other hand, for example, in cases where the accelerator section 131a is an accelerator grip, the determination section 133 is operable, when the accelerator grip is turned by an operator, to detect the "presence of the manipulation", and, when the accelerator grip is not turned, i.e., the accelerator grip is locked, to detect the "absence of the manipulation".

The engine-speed changing regulation section 134 is designed to perform prohibition on changing of the engine speed command to be input into the engine control section 13, and release of the prohibition. The engine-speed changing regulation section 134 is encompassed in the concept of the "command changing regulation section" set forth in the appended claims.

Specifically, the engine-speed changing regulation section 134 is configured to be switched between a changing prohibition mode and a changing permission mode, according to an instruction from the instruction section 42. In the changing prohibition mode, the engine-speed changing regulation section 134 is operable to, even if a value of the command to be output from the accelerator device body 131b is changed, fix an engine speed command which is to be input into the engine control section 13, to a value equal to a value of the command to be output from the accelerator device body 131b upon the absence of the manipulation of the accelerator section 131a. In other words, when the engine-speed changing regulation section 134 is in the changing prohibition mode, the speed of the engine 11 is prohibited from being changed from a value to be set upon the absence of the manipulation of the accelerator section 131a, even if the manipulation of the accelerator section 131a is present. On the other hand, in the changing permission mode, the engine-speed changing regulation section 134 is operable to permit a value of the engine speed command which is to be input into the engine control section 13, to be changed according to changing a value of the command to be output from the accelerator device body 131b. In other words, when the engine-speed changing regulation section 134 is in the changing permission mode, if a value of the command to be output from the accelerator device body 131b is changed according to the manipulation of the accelerator section 131a, accordingly, an engine speed command having a value corresponding to the changed value of the command is input into the engine control section 13.

The engine-speed changing regulation section 134 is electrically connected to the instruction section 42, and further electrically connected to the engine control section 13. The engine-speed changing regulation section 134 is configured to receive an input of a command, from the accelerator device 131 via the determination section 133 and the instruction section 42. The engine-speed changing regulation section 134 is operable, in the changing permission mode, to receive an input of a command and directly output the command to the engine control section 13, and, in the changing prohibition mode, to output, to the engine control section 13, a certain engine speed command having a value equal to a value of the command to be output from the accelerator device body 131b upon the absence of the manipulation of the accelerator section 131a. The engine-speed changing regulation section 134 is set to the changing prohibition mode, during the same period as that where the CV-command changing regulation section 34 is set to the changing prohibition mode in the above embodiment, and set to the changing permission mode, during the same period as that where the CV-command changing regulation section 34 is set to the changing permission mode in the above embodiment. Specifically, the engine-speed changing regulation section 134 is shifted from the changing prohibition mode to the changing permission mode at the same timing as that when the CV command illustrated in the time chart of FIG. 3 is switched from the changing prohibition mode to the changing permission mode. Further, the engine-speed changing regulation section 134 is shifted from the changing permission mode to the changing prohibition mode at the same timing as that when the CV command illustrated in the time chart is switched from the changing permission mode to the changing prohibition mode.

Advantageous Effects I-I and II-I in Modification

In the construction machine according to the above embodiment, the start of changing of the loading level is prohibited during the presence of the manipulation of the manipulation lever 31a (see the zones indicated by the codes T3a and T3b in FIG. 3). Differently, in the construction machine according to the modified embodiment, the start of changing of the loading level is prohibited during the presence of the manipulation of the accelerator section 131a. In other words, when the changing of the loading level is started, the actuator 23 is placed in a state in which the operating speed thereof is not changing.

In the construction machine according to the above embodiment, the CV-command changing regulation section 34 is operable, during the period where the loading level is transiently changing, to prohibit changing of the CV command to prevent the actuator 23 from being operated (see the zones indicated by the codes T1a and T1b in FIG. 3). Differently, in the construction machine according to the modified embodiment, the engine-speed changing regulation section 134 is operable, during the period where the loading level is transiently changing, to prohibit changing of the engine speed command to prevent changing of the speed of the engine 11, i.e., prevent changing of the operating speed of the actuator 23.

Further, in the construction machine according to the above embodiment, during the period where the loading level is kept constant at the predetermined value L (see the zone indicated by the code T2 in FIG. 3), a change in the operation of the actuator 23 due to a change in the loading level never occur. Differently, in the construction machine according to the modified embodiment, during the period where the loading level is kept constant at the predetermined value L, a change in the speed of the engine 11 due to a change in the loading level never occur.

Thus, it becomes possible to suppress the occurrence of a situation where the speed of the engine 11 is changed to a value unexpected by an operator of the construction machine, so that the actuator 23 is operated in a manner unexpected by the operator (in an unsafe manner), during the DPF regeneration (see, for example, the period between Time t1 and Time t4 and the period between Time t7 and Time t12 in FIG. 3).

Advantageous Effect III in Modification

In the construction machine according to the above embodiment, it is possible to suppress the occurrence of a situation where the actuator 23 is suddenly activated immediately after release of the prohibition on changing of the CV command. On the other hand, in the construction machine according to the modified embodiment, it is possible to suppress the occurrence of a situation where the operating speed of the actuator 23 is suddenly changed immediately after release of the prohibition on changing of the engine speed command.

[Other Modifications]

In the configuration of the construction machine illustrated in FIG. 1, an element for shutting off the flow passage between the actuator control valve 24 and the actuator 23 may be provided in the flow passage between the actuator control valve 24 and the actuator 23 to shut off the flow passage so as to suppress a change in the operation of the actuator 23 during changing of the loading level.

Further, the construction machine according to the above embodiment may be configured such that the prohibition on changing of the CV command in the above embodiment, and the prohibition on changing of the engine speed command in the modified embodiment, can be switched therebetween, for example, by a switch.

Outline of Embodiment and Modifications Thereof

The outline of the above embodiment and the modified embodiments is as follows.

According to a first aspect of the above embodiment and the modifications thereof, there is provided a construction machine which comprises: an engine; an exhaust pipe connected to the engine; an exhaust gas purifying device having a filter installed in the exhaust pipe, wherein the exhaust gas purifying device is operable to purify exhaust gas discharged from the engine through the exhaust pipe, by using the filter; a pump driven by the engine so as to discharge hydraulic oil; an actuator connected to the pump via a flow passage and adapted to be operated in response to supply of hydraulic oil from the pump thereto through the flow passage; an actuator control valve provided in the flow passage between the pump and the actuator to control the operation of the actuator; a manipulation device having a manipulation section adapted to be manipulated by an operator, wherein the manipulation device is operable to output a command for providing an instruction about an operation of the actuator control valve according to the manipulation of the manipulation section; a manipulation-state detection section for detecting the presence or absence of the manipulation of the manipulation section; a command changing regulation section configured to be switched between a changing prohibition mode for, even if a value of the command to be output from the manipulation device is changed, fixing a value of a command which is to be assigned to the actuator control valve, to a value equal to a value of the command to be output from the manipulation device upon the absence of the manipulation of the manipulation section, and a changing permission mode for permitting a value of the command which is to be assigned to the actuator control valve, to be changed according to changing a value of the command to be output from the manipulation device; a loading device for imposing, on the engine, a load for raising an exhaust temperature of the engine up to a value at which particulate matter accumulated in the filter is burnt to allow the filter to be regenerated; and an instruction section for instructing the loading device to perform an operation for loading the engine, wherein the instruction section is operable to prohibit the loading device from changing a loading level, which is a level of load to be imposed on the engine by the loading device, during a period where the manipulation-state detection section detects the presence of the manipulation of the manipulation section, and wherein the command changing regulation section is set to the changing permission mode, during a period where the loading level is constant.

In this construction machine, during the period where the manipulation-state detection section detects the presence of the manipulation of the manipulation section, the loading device is prohibited from changing the loading level. In other words, the loading level is changed only during the absence of the manipulation of the manipulation section. Thus, during the period where the loading level is transiently changing, the actuator control valve is not operated, so that the actuator is not operated. Specifically, even if the level of loading on the engine by the loading device is changed during regeneration of the filter in the exhaust gas purifying device to cause a change in engine speed and thus a change in discharge rate of the pump, the actuator is never operated. Thus, this construction machine makes it possible to prevent the actuator from being suddenly operated in a manner unexpected by an operator, during the regeneration of the filter in the exhaust gas purifying device. In this construction machine, during the period where the loading level based on the loading device is constant, the command changing regulation section is set to the changing permission mode for permitting a value of the command which is to be assigned to the actuator control valve, to be changed according to changing a value of the command to be output from the manipulation device. Thus, as compared to cases where the command changing regulation section is configured to continue the prohibition on changing of the command value to be assigned to the actuator control valve, during the loading, irrespective of whether or not the loading level is constant, it becomes possible to reduce a period of time where the operation of the actuator control valve is prohibited in the entire time range of the loading based on the loading device. This makes it possible to shorten a period of time where an operator has to wait while stopping the actuator during the regeneration of the filter in the exhaust gas purifying device, i.e., a waiting time due to the regeneration of the filter in the exhaust gas purifying device.

According to a second aspect of the above embodiment and the modifications thereof, there is provided a construction machine which comprises: an engine; an exhaust pipe connected to the engine; an exhaust gas purifying device having a filter installed in the exhaust pipe, wherein the exhaust gas purifying device is operable to purify exhaust gas discharged from the engine through the exhaust pipe, by using the filter; a pump driven by the engine so as to discharge hydraulic oil; an actuator connected to the pump via a flow passage and adapted to be operated in response to supply of hydraulic oil from the pump thereto through the flow passage; a manipulation device having a manipulation section adapted to be manipulated by an operator, wherein the manipulation device is operable to output a command for providing an instruction about an engine speed of the engine according to the manipulation of the manipulation section; an engine control section for controlling an actual value of the engine speed so that the actual value of the engine speed becomes equal to a value of the engine speed instructed by a command input thereinto; a manipulation-state detection section for detecting the presence or absence of the manipulation of the manipulation section; a command changing regulation section configured to be switched between a changing prohibition mode for, even if a value of the command to be output from the manipulation device is changed, fixing a value of a command which is to be input into the engine control section, to a value equal to a value of the command to be output from the manipulation device upon the absence of the manipulation of the manipulation section, and a changing permission mode for permitting a value of the command which is to be input into the engine control section, to be changed according to changing a value of the command to be output from the manipulation device; a loading device for imposing, on the engine, a load for raising an exhaust temperature of the engine up to a value at which particulate matter accumulated in the filter is burnt to allow the filter to be regenerated; and an instruction section for instructing the loading device to perform an operation for loading the engine, wherein the instruction section is operable to prohibit the loading device from changing a loading level, which is a level of load to be imposed on the engine by the loading device, during a period where the manipulation-state detection section detects the presence of the manipulation of the manipulation section, and wherein the command changing regulation section is set to the changing permission mode, during a period where the loading level is constant.

In this construction machine, during the period where the manipulation-state detection section detects the presence of the manipulation of the manipulation section, the loading device is prohibited from changing the loading level. In other words, during a period where the manipulation section is manipulated, and the engine speed is changed according to the manipulation of the manipulation section, it becomes impossible to change the level of loading on the engine by the loading device, which prevents a change in the engine speed due to a change in the loading level. Specifically, it becomes possible to prevent the occurrence of a situation where, when the manipulation section is manipulated to raise the engine speed, a rise in the engine speed due to a decrease in the loading level occurs simultaneously, or when the manipulation section is manipulated to lower the engine speed, a lowering in the engine speed due to an increase in the loading level occurs simultaneously. This makes it possible to prevent an extreme rise or lowering of the engine speed. Thus, it becomes possible to prevent an extreme change in the engine speed due to a change in the level of loading on the engine by the loading device during the regeneration of the filter in the exhaust gas purifying device, and thus an extreme change in discharge rate of the pump due to the change in the engine speed. This makes it possible to prevent sudden change in operating speed of the actuator during the regeneration of the filter in the exhaust gas purifying device, and thus prevent the actuator from being suddenly operated in a manner unexpected by an operator during the regeneration of the filter in the exhaust gas purifying device. Further, in this construction machine, during the period where the loading level based on the loading device is constant, the command changing regulation section is set to the changing permission mode for permitting a value of the command which is to be input into the engine control section, to be changed according to changing a value of the command to be output from the manipulation device. Thus, as compared to cases where the command changing regulation section is configured to continue the prohibition on changing of the command value to be input into the engine control section, during the loading, irrespective of whether or not the loading level is constant, it becomes possible to reduce a period of time where the changing of the engine speed is prohibited in the entire time range of the loading based on the loading device. Therefore, for example, in a construction work involving changing of the operating speed of the actuator, it becomes possible to shorten a period of time of prohibition on changing the engine speed during the regeneration of the filter in the exhaust gas purifying device, to change the operating speed of the actuator. This makes it possible to shorten a waiting time due to the regeneration of the filter in the exhaust gas purifying device.

Preferably, in the construction machine according to the first or second aspect, when the manipulation-state detection section detects the presence of the manipulation of the manipulation section during a period where the loading level is transiently changing, the command changing regulation section is maintained in the changing prohibition mode, until the manipulation-state detection section subsequently detects the absence of the manipulation of the manipulation section, even after the loading level becomes constant.

In cases where this feature is applied to the construction machine according to the first aspect, it becomes possible to suppress the occurrence of a situation where the actuator control valve is operated at a timing unexpected by an operator, i.e., immediately after the command changing regulation section is shifted from the changing prohibition mode to the changing permission mode, and the operation of the actuator is suddenly started. In cases where this feature is applied to the construction machine according to the second aspect, it becomes possible to suppress the occurrence of a situation where the engine speed is suddenly changed at a timing unexpected by an operator, i.e., immediately after the command changing regulation section is shifted from the changing prohibition mode to the changing permission mode, and the actuator is sudden operated in a manner unexpected by an operator (operated such that the operating speed is suddenly changed).

According to a third aspect of the above embodiment and the modifications thereof, there is provided a construction machine which comprises: an engine; an exhaust pipe connected to the engine; an exhaust gas purifying device having a filter installed in the exhaust pipe, wherein the exhaust gas purifying device is operable to purify exhaust gas discharged from the engine through the exhaust pipe, by using the filter; a pump driven by the engine so as to discharge hydraulic oil; an actuator connected to the pump via a flow passage and adapted to be operated in response to supply of hydraulic oil from the pump thereto through the flow passage; an actuator control valve provided in the flow passage between the pump and the actuator to control the operation of the actuator; a manipulation device having a manipulation section adapted to be manipulated by an operator, wherein the manipulation device is operable to output a command for providing an instruction about an operation of the actuator control valve according to the manipulation of the manipulation section; a command changing regulation section configured to be switched between a changing prohibition mode for, even if a value of the command to be output from the manipulation device is changed, fixing a value of a command which is to be assigned to the actuator control valve, to a value equal to a value of the command to be output from the manipulation device upon the absence of the manipulation of the manipulation section, and a changing permission mode for permitting a value of the command which is to be assigned to the actuator control valve, to be changed according to changing a value of the command to be output from the manipulation device; and a loading device for imposing, on the engine, a load for raising an exhaust temperature of the engine up to a value at which particulate matter accumulated in the filter is burnt to allow the filter to be regenerated, wherein the command changing regulation section is set to the changing prohibition mode during a period where a loading level which is a level of load to be imposed on the engine by the loading device, is transiently changing, and set to the changing permission mode, during a period where the loading level is constant.

In this construction machine, during the period where the loading level based on the loading device is transiently changing, the command changing regulation section is set to the changing prohibition mode for, even if a value of the command to be output from the manipulation device is changed, fixing a value of a command which is to be assigned to the actuator control valve, to a value equal to a value of the command to be output from the manipulation device upon the absence of the manipulation of the manipulation section. Thus, during the period where the loading level is transiently changing, the actuator control valve is not operated, so that the actuator is not operated. Specifically, even if the level of loading on the engine by the loading device is changed during regeneration of the filter in the exhaust gas purifying device to cause a change in engine speed and thus a change in discharge rate of the pump, the actuator is never operated. Thus, this construction machine makes it possible to prevent the actuator from being suddenly operated in a manner unexpected by an operator, during the regeneration of the filter in the exhaust gas purifying device. In this construction machine, during the period where the loading level based on the loading device is constant, the command changing regulation section is set to the changing permission mode for permitting a value of the command which is to be assigned to the actuator control valve, to be changed according to changing a value of the command to be output from the manipulation device. Thus, as with the construction machine according to the first aspect, it becomes possible to shorten a period of time where an operator has to wait while stopping the actuator during the regeneration of the filter in the exhaust gas purifying device, i.e., a waiting time due to the regeneration of the filter in the exhaust gas purifying device.

According to a fourth aspect of the above embodiment and the modifications thereof, there is provided a construction machine which comprises: an engine; an exhaust pipe connected to the engine; an exhaust gas purifying device having a filter installed in the exhaust pipe, wherein the exhaust gas purifying device is operable to purify exhaust gas discharged from the engine through the exhaust pipe, by using the filter; a pump driven by the engine so as to discharge hydraulic oil; an actuator connected to the pump via a flow passage and adapted to be operated in response to supply of hydraulic oil from the pump thereto through the flow passage; a manipulation device having a manipulation section adapted to be manipulated by an operator, wherein the manipulation device is operable to output a command for providing an instruction about an engine speed of the engine according to the manipulation of the manipulation section; an engine control section for controlling an actual value of the engine speed so that the actual value of the engine speed becomes equal to a value of the engine speed instructed by a command input thereinto; a command changing regulation section configured to be switched between a changing prohibition mode for, even if a value of the command to be output from the manipulation device is changed, fixing a value of a command which is to be input into the engine control section, to a value equal to a value of the command to be output from the manipulation device upon the absence of the manipulation of the manipulation section, and a changing permission mode for permitting a value of the command which is to be input into the engine control section, to be changed according to changing a value of the command to be output from the manipulation device; and a loading device for imposing, on the engine, a load for raising an exhaust temperature of the engine up to a value at which particulate matter accumulated in the filter is burnt to allow the filter to be regenerated, wherein the command changing regulation section is set to the changing prohibition mode during a period where a loading level which is a level of load to be imposed on the engine by the loading device, is transiently changing, and set to the changing permission mode, during a period where the loading level is constant.

In this construction machine, during the period where the loading level based on the loading device is transiently changing, the command changing regulation section is set to the changing prohibition mode for, even if a value of the command to be output from the manipulation device is changed, fixing a value of a command which is to be input into the engine control section, to a value equal to a value of the command to be output from the manipulation device upon the absence of the manipulation of the manipulation section. Thus, during the period where the loading level is transiently changing, the engine speed is not changed, so that a change in the operating speed of the actuator is suppressed. Therefore, in this construction machine, even if the level of loading on the engine by the loading device is changed during regeneration of the filter in the exhaust gas purifying device, it becomes possible to prevent the actuator from being suddenly operated in a manner unexpected by an operator, during the filter regeneration. In this construction machine, during the period where the loading level based on the loading device is constant, the command changing regulation section is set to the changing permission mode for permitting a value of the command which is to be input into the engine control section, to be changed according to changing a value of the command to be output from the manipulation device. Thus, as with the construction machine according to the second aspect, it becomes possible to shorten a waiting time due to the regeneration of the filter in the exhaust gas purifying device.

Preferably, the construction machine according to the third or fourth aspect further comprises a manipulation-state detection section for detecting the presence or absence of the manipulation of the manipulation section, wherein, when the manipulation-state detection section detects the presence of the manipulation of the manipulation section during the period where the loading level is transiently changing, the command changing regulation section is maintained in the changing prohibition mode, until the manipulation-state detection section subsequently detects the absence of the manipulation of the manipulation section, even after the loading level becomes constant.

In cases where this feature is applied to the construction machine according to the third aspect, it becomes possible to suppress the occurrence of a situation where the actuator control valve is operated at a timing unexpected by an operator, i.e., immediately after the command changing regulation section is shifted from the changing prohibition mode to the changing permission mode, and the operation of the actuator is suddenly started. In cases where this feature is applied to the construction machine according to the fourth aspect, it becomes possible to suppress the occurrence of a situation where the engine speed is suddenly changed at a timing unexpected by an operator, i.e., immediately after the command changing regulation section is shifted from the changing prohibition mode to the changing permission mode, and the actuator is sudden operated in a manner unexpected by an operator (operated such that the operating speed is suddenly changed).

Preferably, in the above construction machine, the loading device has a pressure control valve provided in the flow passage, wherein the pressure control valve is operable, during the loading on the engine, to raise a discharge pressure of the pump to load the engine which is driving the pump, and wherein a portion of the flow passage connecting between the pump and the pressure control valve is configured to allow a flow rate of hydraulic oil discharged from the pump to become equal to a flow rate of hydraulic oil flowing into the pressure control valve.

According to this feature, it becomes possible to suppress a lowering in the operating speed of the actuator when the loading device performs the loading on the engine to regenerate the filter of the exhaust gas purifying device. Specifically, assuming that a portion of the flow passage connecting between the pump and pressure control valve is configured such that the flow rate of hydraulic oil discharged from the pump becomes different from the flow rate of hydraulic oil flowing into the pressure control valve, for example, branched flow passage is connected to the portion of the flow passage connecting between the pump and pressure control valve, hydraulic oil flowing in the portion before start of the loading becomes more likely to flow into the branched flow passage, after the loading based on the loading device is started and thereby a discharge pressure of the pump is raised by the pressure control valve. In this case, a flow rate of hydraulic oil flowing into the actuator via the pressure control valve is reduced as compared with that before start of the loading, so that the operating speed of the actuator is lowered as compared with that before start of the loading. In contrast, according to the above feature, the portion of the flow passage connecting between the pump and pressure control valve is configured to allow the flow rate of hydraulic oil discharged from the pump to become equal to the flow rate of hydraulic oil flowing into the pressure control valve, so that it becomes possible to prevent a reduction of the flow rate of hydraulic oil flowing into the actuator via the pressure control valve during the loading. This makes it possible to suppress lowering in the operating speed of the actuator during the loading.

More preferably, in this case, the pressure control valve is an externally drained type configured such that a primary pressure of the pressure control valve is free of an influence of a secondary pressure of the pressure control valve.

According to this feature, it becomes possible to allow the primary pressure of the pressure control valve of the loading device during the loading, i.e., a load imposed on the pump by the pressure control valve during loading (discharge pressure of the pump), to become free of an influence of the secondary pressure of the pressure control valve to be changed depending on an operating state of the actuator, etc.

As described above, the above embodiment and the modifications thereof make it possible to suppress the occurrence of a situation where an actuator is operated in a manner unexpected by an operator, during regeneration of a filter of an exhaust gas purifying device, and shorten a waiting time due to the filter regeneration This application is based on Japanese Patent application No. 2011-054597 filed in Japan Patent Office on Mar. 11, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. A construction machine comprising:
an engine;
an exhaust pipe connected to the engine;
an exhaust gas purifying device having a filter installed in the exhaust pipe, the exhaust gas purifying device being operable to purify exhaust gas discharged from the engine through the exhaust pipe, by using the filter;
a pump driven by the engine so as to discharge hydraulic oil;
an actuator connected to the pump via a flow passage and adapted to be operated in response to supply of hydraulic oil from the pump thereto through the flow passage;
an actuator control valve provided in the flow passage between the pump and the actuator to control the operation of the actuator;
a manipulation device having a manipulation section adapted to be manipulated by an operator, the manipulation device being operable to output a command for providing an instruction about an operation of the actuator control valve according to the manipulation of the manipulation section;
a manipulation-state detection section for detecting the presence or absence of the manipulation of the manipulation section;
a command changing regulation section configured to be switched between a changing prohibition mode for, even if a value of the command to be output from the manipulation device is changed, fixing a value of a command which is to be assigned to the actuator control valve, to a value equal to a value of the command to be output from the manipulation device upon the absence of the manipulation of the manipulation section, and a changing permission mode for permitting a value of the command which is to be assigned to the actuator control valve, to be changed according to changing a value of the command to be output from the manipulation device;
a loading device for imposing, on the engine, a load for raising an exhaust temperature of the engine up to a value at which particulate matter accumulated in the filter is burnt to allow the filter to be regenerated; and
an instruction section for instructing the loading device to perform an operation for loading the engine,
wherein the instruction section is operable to prohibit the loading device from changing a loading level, which is a level of load to be imposed on the engine by the loading device, during a period where the manipulation-state detection section detects the presence of the manipulation of the manipulation section, and
wherein the command changing regulation section is set to the changing permission mode, during a period where the loading level is constant.

2. The construction machine as defined in claim 1, wherein, when the manipulation-state detection section detects the presence of the manipulation of the manipulation section during a period where the loading level is transiently changing, the command changing regulation section is maintained in the changing prohibition mode, until the manipulation-state detection section subsequently detects the absence of the manipulation of the manipulation section, even after the loading level becomes constant.

3. The construction machine as defined in claim 1, wherein the loading device has a pressure control valve provided in the flow passage, the pressure control valve being operable, during the loading on the engine, to raise a discharge pressure of the pump to load the engine which is driving the pump, and wherein a portion of the flow passage connecting between the pump and the pressure control valve is configured to allow a flow rate of hydraulic oil discharged from the pump to become equal to a flow rate of hydraulic oil flowing into the pressure control valve.

4. The construction machine as defined in claim 3, wherein the pressure control valve is an externally drained type configured such that a primary pressure of the pressure control valve is free of an influence of a secondary pressure of the pressure control valve.

5. A construction machine comprising:
an engine;
an exhaust pipe connected to the engine;
an exhaust gas purifying device having a filter installed in the exhaust pipe, the exhaust gas purifying device being operable to purify exhaust gas discharged from the engine through the exhaust pipe, by using the filter;
a pump driven by the engine so as to discharge hydraulic oil;
an actuator connected to the pump via a flow passage and adapted to be operated in response to supply of hydraulic oil from the pump thereto through the flow passage;
a manipulation device having a manipulation section adapted to be manipulated by an operator, the manipulation device being operable to output a command for providing an instruction about an engine speed of the engine according to the manipulation of the manipulation section;
an engine control section for controlling an actual value of the engine speed so that the actual value of the engine speed becomes equal to a value of the engine speed instructed by a command input thereinto;
a manipulation-state detection section for detecting the presence or absence of the manipulation of the manipulation section;
a command changing regulation section configured to be switched between a changing prohibition mode for, even if a value of the command to be output from the manipulation device is changed, fixing a value of a command which is to be input into the engine control section, to a value equal to a value of the command to be output from the manipulation device upon the absence of the manipulation of the manipulation section, and a changing permission mode for permitting a value of the command which is to be input into the engine control section, to be changed according to changing a value of the command to be output from the manipulation device;
a loading device for imposing, on the engine, a load for raising an exhaust temperature of the engine up to a value at which particulate matter accumulated in the filter is burnt to allow the filter to be regenerated; and
an instruction section for instructing the loading device to perform an operation for loading the engine,
wherein the instruction section is operable to prohibit the loading device from changing a loading level, which is a level of load to be imposed on the engine by the loading device, during a period where the manipulation-state detection section detects the presence of the manipulation of the manipulation section, and
wherein the command changing regulation section is set to the changing permission mode, during a period where the loading level is constant.

6. The construction machine as defined in claim 5, wherein, when the manipulation-state detection section detects the presence of the manipulation of the manipulation section during a period where the loading level is transiently changing, the command changing regulation section is maintained in the changing prohibition mode, until the manipulation-state detection section subsequently detects the absence of the manipulation of the manipulation section, even after the loading level becomes constant.

7. The construction machine as defined in claim 5, wherein the loading device has a pressure control valve provided in the flow passage, the pressure control valve being operable, during the loading on the engine, to raise a discharge pressure of the pump to load the engine which is driving the pump, and wherein a portion of the flow passage connecting between the pump and the pressure control valve is configured to allow a flow rate of hydraulic oil discharged from the pump to become equal to a flow rate of hydraulic oil flowing into the pressure control valve.

8. The construction machine as defined in claim 7, wherein the pressure control valve is an externally drained type configured such that a primary pressure of the pressure control valve is free of an influence of a secondary pressure of the pressure control valve.

9. A construction machine comprising:
an engine;
an exhaust pipe connected to the engine;
an exhaust gas purifying device having a filter installed in the exhaust pipe, the exhaust gas purifying device being operable to purify exhaust gas discharged from the engine through the exhaust pipe, by using the filter;
a pump driven by the engine so as to discharge hydraulic oil;
an actuator connected to the pump via a flow passage and adapted to be operated in response to supply of hydraulic oil from the pump thereto through the flow passage;
an actuator control valve provided in the flow passage between the pump and the actuator to control the operation of the actuator;
a manipulation device having a manipulation section adapted to be manipulated by an operator, the manipulation device being operable to output a command for providing an instruction about an operation of the actuator control valve according to the manipulation of the manipulation section;
a command changing regulation section configured to be switched between a changing prohibition mode for, even if a value of the command to be output from the manipulation device is changed, fixing a value of a command which is to be assigned to the actuator control valve, to a value equal to a value of the command to be output from the manipulation device upon the absence of the manipulation of the manipulation section, and a changing permission mode for permitting a value of the command which is to be assigned to the actuator control valve, to be changed according to changing a value of the command to be output from the manipulation device; and
a loading device for imposing, on the engine, a load for raising an exhaust temperature of the engine up to a value at which particulate matter accumulated in the filter is burnt to allow the filter to be regenerated,
wherein the command changing regulation section is set to the changing prohibition mode during a period where a loading level, which is a level of load to be imposed on the engine by the loading device, is transiently changing, and set to the changing permission mode, during a period where the loading level is constant.

10. The construction machine as defined in claim 9, which further comprises a manipulation-state detection section for detecting the presence or absence of the manipulation of the manipulation section, wherein, when the manipulation-state detection section detects the presence of the manipulation of the manipulation section during the period where the loading level is transiently changing, the command changing regulation section is maintained in the changing prohibition mode, until the manipulation-state detection section subsequently detects the absence of the manipulation of the manipulation section, even after the loading level becomes constant.

11. The construction machine as defined in claim 9, wherein the loading device has a pressure control valve provided in the flow passage, the pressure control valve being operable, during the loading on the engine, to raise a discharge pressure of the pump to load the engine which is driving the pump, and wherein a portion of the flow passage connecting between the pump and the pressure control valve is configured to allow a flow rate of hydraulic oil discharged from the pump to become equal to a flow rate of hydraulic oil flowing into the pressure control valve.

12. The construction machine as defined in claim 11, wherein the pressure control valve is an externally drained type configured such that a primary pressure of the pressure control valve is free of an influence of a secondary pressure of the pressure control valve.

13. A construction machine comprising:
an engine;
an exhaust pipe connected to the engine;
an exhaust gas purifying device having a filter installed in the exhaust pipe, the exhaust gas purifying device being operable to purify exhaust gas discharged from the engine through the exhaust pipe, by using the filter;
a pump driven by the engine so as to discharge hydraulic oil;
an actuator connected to the pump via a flow passage and adapted to be operated in response to supply of hydraulic oil from the pump thereto through the flow passage;
a manipulation device having a manipulation section adapted to be manipulated by an operator, the manipulation device being operable to output a command for providing an instruction about an engine speed of the engine according to the manipulation of the manipulation section;
an engine control section for controlling an actual value of the engine speed so that the actual value of the engine speed becomes equal to a value of the engine speed instructed by a command input thereinto;
a command changing regulation section configured to be switched between a changing prohibition mode for, even if a value of the command to be output from the manipulation device is changed, fixing a value of a command which is to be input into the engine control section, to a value equal to a value of the command to be output from the manipulation device upon the absence of the manipulation of the manipulation section, and a changing permission mode for permitting a value of the command which is to be input into the engine control section, to be changed according to changing a value of the command to be output from the manipulation device; and
a loading device for imposing, on the engine, a load for raising an exhaust temperature of the engine up to a value at which particulate matter accumulated in the filter is burnt to allow the filter to be regenerated,
wherein the command changing regulation section is set to the changing prohibition mode during a period where a loading level which is a level of load to be imposed on the engine by the loading device, is transiently changing, and set to the changing permission mode, during a period where the loading level is constant.

14. The construction machine as defined in claim 13, which further comprises a manipulation-state detection section for detecting the presence or absence of the manipulation of the manipulation section, wherein, when the manipulation-state detection section detects the presence of the manipulation of the manipulation section during the period where the loading level is transiently changing, the command changing regulation section is maintained in the changing prohibition mode, until the manipulation-state detection section subsequently detects the absence of the manipulation of the manipulation section, even after the loading level becomes constant.

15. The construction machine as defined in claim 13, wherein the loading device has a pressure control valve provided in the flow passage, the pressure control valve being operable, during the loading on the engine, to raise a discharge pressure of the pump to load the engine which is driving the pump, and wherein a portion of the flow passage connecting between the pump and the pressure control valve is configured to allow a flow rate of hydraulic oil discharged from the pump to become equal to a flow rate of hydraulic oil flowing into the pressure control valve.

16. The construction machine as defined in claim 15, wherein the pressure control valve is an externally drained type configured such that a primary pressure of the pressure control valve is free of an influence of a secondary pressure of the pressure control valve.

* * * * *